ACCUMULATOR READOUT DEVICE

Filed Dec. 19, 1958 11 Sheets-Sheet 1

INVENTORS
Martin Kassel
Günter Martens
by:
Michael S. Striker
Attorney

July 16, 1963 M. KASSEL ETAL 3,097,789

ACCUMULATOR READOUT DEVICE

Filed Dec. 19, 1958 11 Sheets-Sheet 2

INVENTORS
Martin Kassel
Günter Martens
by:
Michael S. Striker
Attorney

July 16, 1963 M. KASSEL ETAL 3,097,789

ACCUMULATOR READOUT DEVICE

Filed Dec. 19, 1958 11 Sheets-Sheet 3

INVENTORS
Martin Kassel
Günter Martens
by Michael S. Striker
Attorney

ACCUMULATOR READOUT DEVICE

Filed Dec. 19, 1958 11 Sheets-Sheet 4

INVENTORS
Martin Kassel
Günter Martens
by: Michael S. Striker
Attorney

July 16, 1963 M. KASSEL ETAL 3,097,789

ACCUMULATOR READOUT DEVICE

Filed Dec. 19, 1958 11 Sheets-Sheet 5

INVENTORS
Martin Kassel
Günter Martens
by:
Michael S. Striker
Attorney

July 16, 1963 M. KASSEL ETAL 3,097,789

ACCUMULATOR READOUT DEVICE

Filed Dec. 19, 1958 11 Sheets-Sheet 6

INVENTORS
Martin Kassel
Günter Martens
by: Michael S. Striker
Attorney

ACCUMULATOR READOUT DEVICE

Filed Dec. 19, 1958 11 Sheets-Sheet 7

INVENTORS
Martin Kassel
Günter Martens
by:
Michael S. Striker
Attorney

July 16, 1963 M. KASSEL ETAL 3,097,789

ACCUMULATOR READOUT DEVICE

Filed Dec. 19, 1958 11 Sheets-Sheet 8

INVENTORS
Martin Kassel
Günter Martens
by:
Michael S. Striker
Attorney

July 16, 1963 M. KASSEL ETAL 3,097,789

ACCUMULATOR READOUT DEVICE

Filed Dec. 19, 1958 11 Sheets-Sheet 9

INVENTORS
Martin Kassel
Günter Martens
by
Michael S. Striker
Attorney

ACCUMULATOR READOUT DEVICE

Filed Dec. 19, 1958 11 Sheets-Sheet 10

INVENTORS
Martin Kassel
Günter Martens
by:
Michael S. Striker
Attorney

July 16, 1963 M. KASSEL ETAL 3,097,789

ACCUMULATOR READOUT DEVICE

Filed Dec. 19, 1958 11 Sheets-Sheet 11

INVENTORS
Martin Kassel
Günter Martens
by:
Michael S. Striker
Attorney

United States Patent Office 3,097,789
Patented July 16, 1963

3,097,789

ACCUMULATOR READOUT DEVICE

Martin Kassel, Grafelfing, near Munich, and Günter Martens, Schliersee, Upper Bavaria, Germany, assignors to Kienzle Apparate G.m.b.H., Villingen, Black Forest, Germany Filed Dec. 19, 1958, Ser. No. 781,779
Claims priority, application Germany May 21, 1955
25 Claims. (Cl. 235—61)

The present invention refers to electronic calculating machines, and more particularly to a method and apparatus for transferring numerical values accumulated in an electronic accumulator including at least one counting stage, to a mechanical counting, indicating or printing apparatus.

More broadly, the present invention applies to transferring the above mentioned numerical values from any types of an electronic accumulator in which at a given moment certain numerical values are stored and have to be transferred from this accumulator into apparatus of the type set forth.

The present application is a continuation-in-part of the copending application Serial No. 585,866, filed May 18, 1956, now abandoned, entitled "Process for Transferring Values Contained in Electronic Counters to Mechanic Counters and/or Printing Devices."

It has been found that known apparatus or methods for transferring numerical values from electronic counting devices or accumulators into mechanical counters, indicating or printing apparatus are comparatively involved and cannot be satisfactorily operated in connection with various types of electronic counting apparatus. This is particularly true where the electronic counting device or accumulator is for instance composed of magnetizable elements arranged as counting stages.

In calculating machines equipped with such an electronic accumulator operating only in one direction with increasing digit values and comprising particularly a plurality of counting stages, or magnetic counting rings, it has only been possible up to now to transfer to the mechanical counting, indicating or printing apparatus the complement value of the stored number or digit. Therefore, if the regular or original value of the stored number or digit had to be printed or indicated, it was necessary to translate the complement value position of the digit-determining control elements of said mechanical apparatus so as to indicate or print the regular number or digit value, for instance by providing the indicator or printing means, e.g., the types of the individual printing wheels, with a sequence of number types which are arranged in reversed direction. Wherever this old system has been applied, the numerical value "0" is transmitted to the mechanical control elements only upon the tenth step (in a decimal counting system) from the counting stages of the electronic accumulator, which, in turn, entails the necessity that for the purpose of correctly printing the numerical values the individual type wheels must be shifted one step as compared with the ordinary and conventional construction and operation of ordinary printing apparatus, so that the otherwise conventional idle step is made ineffective. However, if the otherwise conventional arrangements and structure of the mechanical control elements is specifically modified, then it is not possible anymore to use a standard keyboard or totalizing device of conventional office machines because in such machines it is common practice to arrange numerical values and to transfer them in the sequence from "0" to "9."

It has been discovered that all the above difficulties and drawbacks could be avoided if a method or apparatus could be found for carrying out the read-out operation in such a system in the individual decimal orders of the units of the electronic accumulator during the printing operation, in reverse sequence. If this were done then the numerical value "0" would appear at the first step of the control elements of the printing apparatus and the actual or regular numerical value of the counted or stored value would be transferred to the mechanical control elements instead of the complement value thereof. Attempts to redesign particularly the magnetic counter elements in such a manner as to count in reverse sequence have resulted in only extremely involved and complicated arrangements so that generally systems or apparatus of this type have not found their way into practical use. It should be noted that in this known method of counting in reverse sequence or direction the individual numerical value stored in one order unit of an electronic accumulator is reduced every time by means of a subtractively acting stepping impulse, each such impulse causing a reduction of the stored value by a numerical unit "1." After carrying out ten such subtractive counting steps the particular counting stage is then restored to its condition corresponding to the originally stored value.

It is therefore a main object of the present invention to provide for a method and an apparatus for transferring numerical values accumulated in an electronic accumulator including at least one counting stage, to a mechanical counting, indicating or printing apparatus.

It is the further object of this invention to provide a method and apparatus of the type set forth which is particularly simple in design or execution, respectively, while at the same time being highly efficient and reliable.

It is another object of the present invention to establish a method and apparatus that would avoid all the difficulties described above and typical of the prior art and at the same time constitute a method and apparatus of comparatively simple type.

It is still a further object of this invention to provide a method and apparatus that would permit using an electronic accumulator arrangement alternatively either for counting or printing the actual values of certain numbers, or, in turn, print or count the complement values of said numbers.

With above objects in mind, the method according to the present invention serves to transfer numerical values accumulated in an electronic accumulator including at least one counting stage, to a mechanical counting, indicating or printing apparatus having at least one set of incrementally movable digit-determining control elements capable of sequentially assuming positions respectively associated with a series of digits forming part of a numerical value to be indicated or printed, and mainly comprises the steps of first incrementally moving said set of control elements through said series of positions; simultaneously generating a series of electric impulses respectively synchronous with the passing of said control elements through said individual positions; injecting said electrical impulses sequentially into said accumulator for accordingly changing incrementally the numerical value stored therein before the start of the transferring operation and for causing said accumulator to furnish a control impulse when during said incrementally changing operation the counting capacity of said counting stages is exhausted; and arresting said set of control elements by means of said control impulse in the particular position occupied thereby at the time when said control impulse occurs.

In another aspect of this invention an arrangement for transferring numerical values accumulated in an electronic accumulator including at least one counting stage, to a mechanical counting, indicating or printing apparatus having at least one set of incrementally movable digit-determining control elements capable of sequentially assuming positions respectively associated with a series of digits forming part of a numerical value to be indicated or printed, comprises, in combination, drive means for advancing said set of control elements incrementally through said sequence of positions; impulse generator means operatively connected with said set of control elements and capable of generating a sequence of counting impulses respectively synchronous with the passing of said set of control elements through said individual positions; circuit means connecting said impulse generator means with said counting stage for injecting said counting impulse into the latter; arresting means operatively connected with said set of control means, said arresting means being responsive to a control impulse applied thereto and capable of arresting said set of control elements in any one of said positions thereof upon application of such a control impulse; and circuit means connecting said counting stage with said arresting means and capable of transmitting thereto said control impulse every time when during injecting said counting impulses the counting capacity of said counting stage is exhausted.

In still another aspect of this invention, a preferred method for transferring accumulated multi-order numerical values from an electronic accumulator composed of a plurality of counting stages into a mechanical counting, indicating or printing apparatus, mainly consists in a first step of injecting consecutively a plurality of series of simultaneous stepping impulses respectively into each of said stages for step-wise increasing the stored numerical values, the number of impulses constituting said individual series being predetermined for obtaining at the end of at least one of such series a plurality of numerical values stored in said elements, respectively, which are respectively reduced by one numerical unit relatively to the respective values stored before injection of said particular series of impulses; a second step of preventing during the injection of each of said series of impulses the transmission of carry-over impulses upon exhaustion of the counting capacity of any one of said accumulator stages, except where such exhaustion of counting capacity occurs in any one of said elements upon the last impulse of the particular series of said stepping impulses; and a last step of transmitting to said mechanical apparatus only such carry-over impulses which occur in any one of said stages upon said last impulse, for causing said apparatus to make appear multi-order numerical values corresponding in each of its orders to the numerical value which before the start of the first of said plurality of series of stepping impulses was stored in that one of said counting stages in which said carry-over impulse occurred upon the last one of said stepping impulses of the particular series.

In a further aspect of this invention, a preferred arrangement for transferring multi-order numerical values from an electronic calculator or accumulator into a mechanical counting, indicating or printing apparatus, mainly comprises a plurality of control elements moving stepwise between consecutive digit-determining positions and forming part of said mechanical apparatus, each of said control elements being associated with one order unit of said apparatus and being capable of being arrested in any one of its digit-determining positions; an electronic accumulator means including a plurality of counting stages, gate means and locking magnet means respectively associated with each other for being capable of being actuated alternatively: for the operation of accumulating multi-order numerical values in accordance with counting impulses injected into said accumulator means, or for the operation of selectively arresting selected ones of said control elements in one of said positions by impulses emitted from respective counting stages into associated gate means and locking magnet means in accordance with series of consecutive impulses simultaneously injected into said counting units; shift register means including a plurality of counting stages and first impulse generator means and being capable of producing said series of consecutive impulses upon receiving a first control impulse from said first impulse generator means; second impulse generator means operatively connected with said control elements for furnishing with each step thereof a control impulse alternatively adapted to be injected into said electronic accumulator or said shift register means; and a plurality of switch means respectively connected with said electronic accumulator and shift register means for changing said electronic accumulator means between said alternative modes of operation, and for alternatively connecting said second impulse generator means with said accumulator or with said shift register means.

It will be shown that in accordance with the invention the intended result of restoring the stored digit value after a predetermined number of counting steps without having to carry out the counting operation in reverse direction, can be achieved by injecting into all units or counting stages of the electronic accumulator simultaneously series of consecutive impulses which are adapted to shift the stored values in positive or forward direction, in such a manner that at the termination of each individual series of consecutive impulses, the values stored in the accumulator appear to be shifted in reverse direction; during this operation it is necessary to prevent carry-over operations from being effected between consecutive order units so that only those carry-over or transfer impulses are utilized for operating the mechanical apparatus, which have been caused by the last mechanical impulse of one particular series of impulses in a particular unit or stage of the electronic accumulator. For instance, in the case of a decimal or ten-digit number system, the above-mentioned necessity of counting subtractively is avoided by injecting with every step of the control elements of the printing or indicating apparatus a series of 9 impulses additively into each counting element of the accumulator simultaneously. After 10 such steps of the control elements of the mechanical apparatus a total of $10\times9$, i.e., 90 impulses have been totally injected into each individual counting stage of the accumulator, the carry-over impulses between the individual order units or elements of the accumulator being suppressed or eliminated every time the counting capacity of the individual counting stages is exhausted at the arrival at the numerical value 10, with the result, that at the end of the total operation the original numerical value that was originally stored in the electronic accumulator is restored therein. It can be seen that in accordance with this method, a stored numerical value in each individual counting stage is reduced by the numerical unit "1" every time after the injection of one series of 9 consecutive impulses is completed. It is further clear that during the injection of each one of these series of 9 consecutive impulses, in each order unit or counting stage of the accumulator one restoring impulse must appear. These restoring impulses can be used for energizing certain magnetic locking means which are intended to arrest the associated mechanical control means of the above-mentioned apparatus in a certain position thereof. However of these restoring impulses only those are permitted to energize or cause to energize a locking magnet which occur with the last impulse of such a 9-impulse series. This performance can be provided for by arranging between the individual counting stages of the accumulator and their respectively associated locking magnet means a gate device which is open or in non-blocking condition only during the time period of the above-mentioned last impulse of one series.

It can further be seen that with the aid of the above described system a counting operation of the electronic accumulator in seemingly reverse direction can be obtained without the necessity of reversing the direction of counting of the various counting stages or units of the accumulator. Yet there would remain still the difficulty that the numerical value "0" is transmitted to the control element of the mechanical apparatus only when the tenth step of the step-wise moving control elements of the printing apparatus occurs.

In order to eliminate also this difficulty, the present invention provides for a modification of the above outlined method in such a manner that with the first step of the control elements of the mechanical apparatus one single series of ten impulses (in the case of a 10-digit numerical system) is injected simultaneously into all the counting stages of the accumulator, and only after this first series of ten impulses the above mentioned further ten series of 9 impulses each are injected. By reading out the individual counting stages or order units of the electronic accumulator by means of a 10-impulse series the desired result is obtained, namely all the counting stages which did contain the stored numerical value "0" will now transmit this particular value to the control elements of the mechanical apparatus during the first step thereof, namely by means of arresting the particular control elements with the aid of the actuation of locking magnet means. From the same unit or counting stage of the accumulator the value "1" would be transferred upon the second step of the control elements by means of the next following series of 9 impulses, similarly upon the third step of the control elements the value "2" will be transmitted and so on until upon the tenth step of the control elements the numerical value "9" would be transmitted to the control elements. An eleventh step is provided in conjunction with a last series of 9 impulses although this step does not correspond to a step or movement of the control elements of the mechanical apparatus, but this step is necessary for the purpose of restoring the originally stored numerical values in the various counting stages of the electronic accumulator. Now in this manner it is possible to transmit the regular or actual numerical value of the stored numbers to the mechanical control elements of the mechanical apparatus without omitting the requirement of having the numerical value "0" transferred with the first step of the control elements.

The mode of operation of the arrangement which carries out the above-described function can be changed in a rather simple manner according to the invention for operating in such a way that the complement values of the originally stored numbers are transmitted. This change of operation is obtained by carrying out the read-out operation not by means of series of impulses but by injecting with every step of the control elements of the mechanical apparatus only one impulse into the electronic accumulator. In this case, with the first step of the control elements the complement value of "9" namely "0" is transmitted to the control elements of the mechanical apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 4:
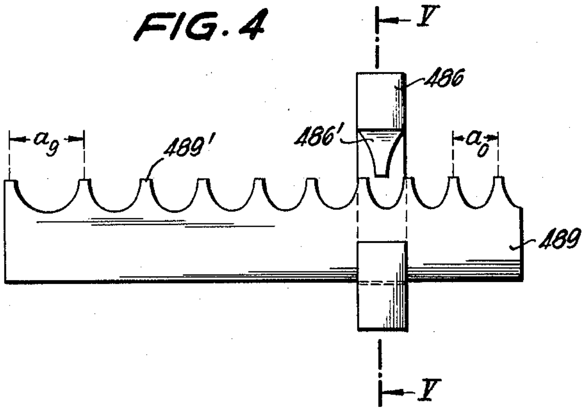
FIGS. 4 and 5 illustrate in front elevation and sectional end view, taken along lines V—V of FIG. 4, a component of the apparatus according to the invention.
Figure 4A:
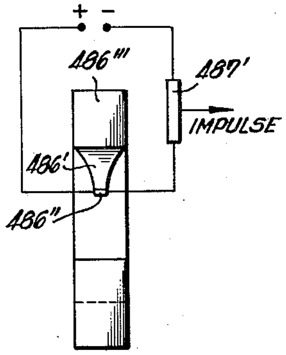
Figure 5:
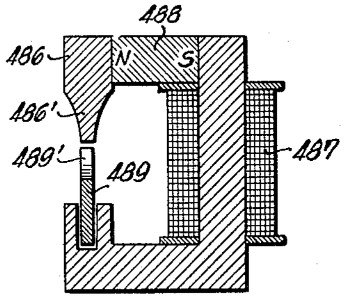
Figure 5A:
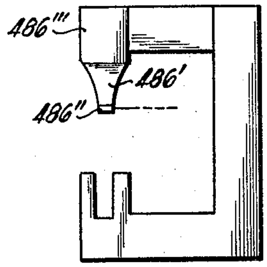
Figure 6:
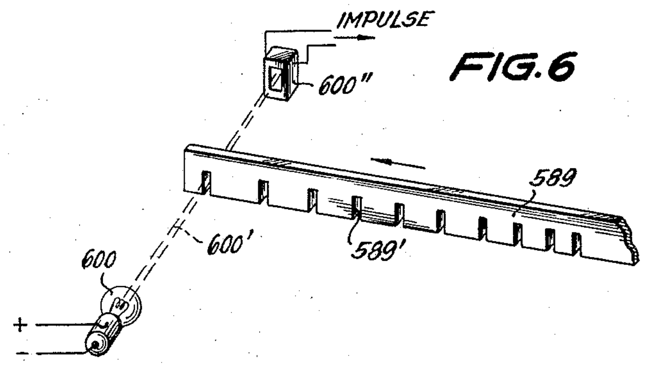
Figure 7:
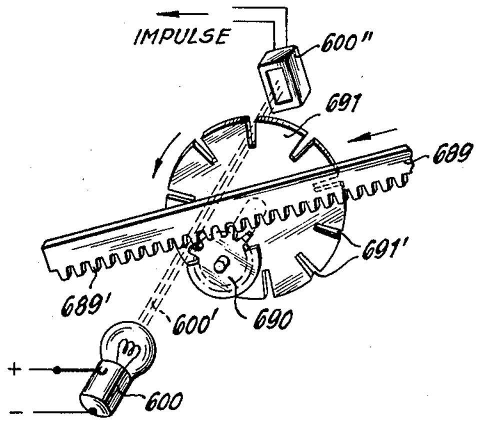
Figure 8:
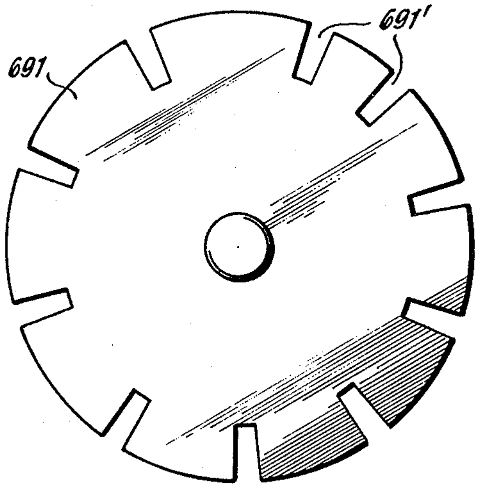
Figure 9:
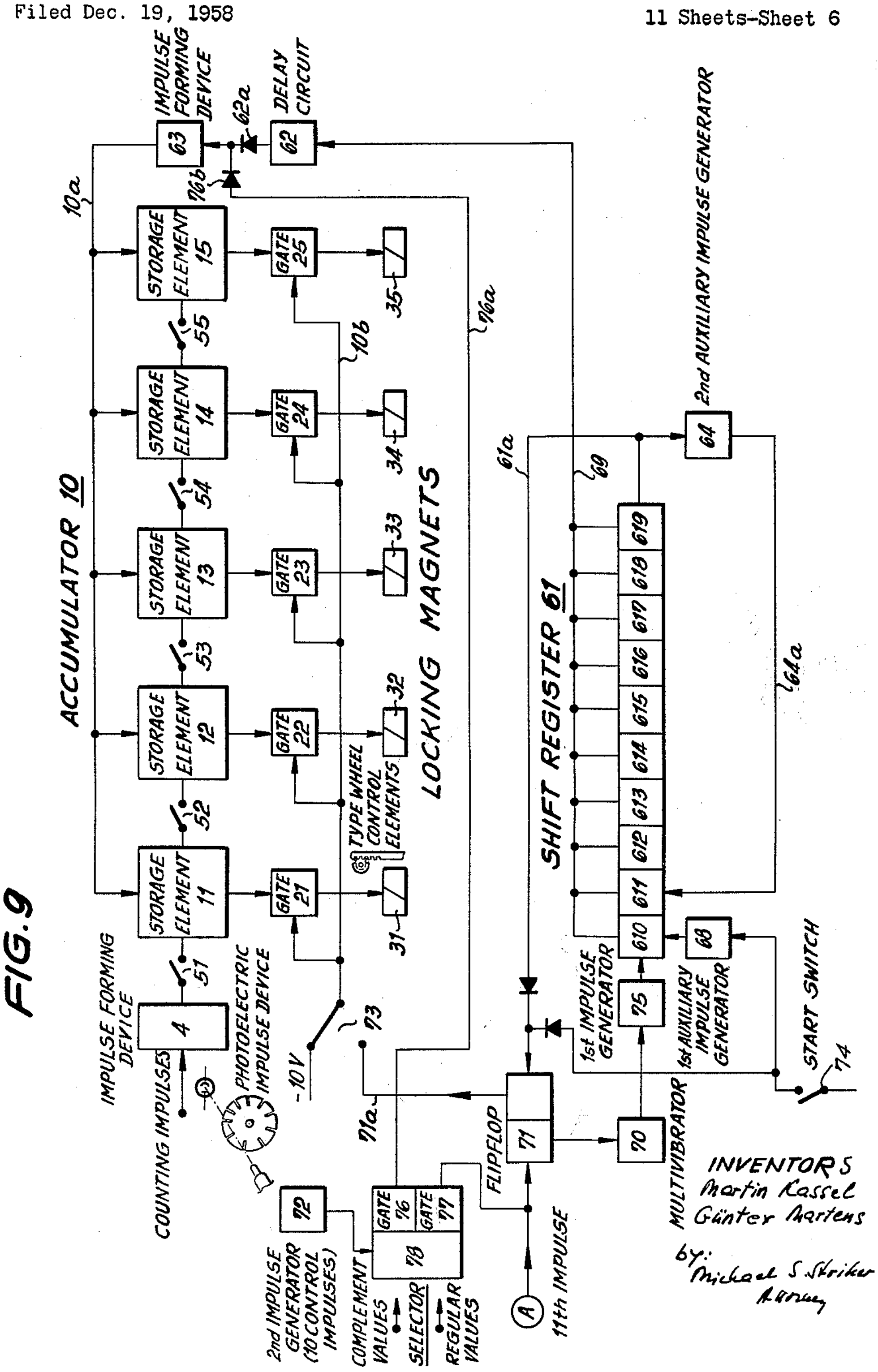
Figure 10:
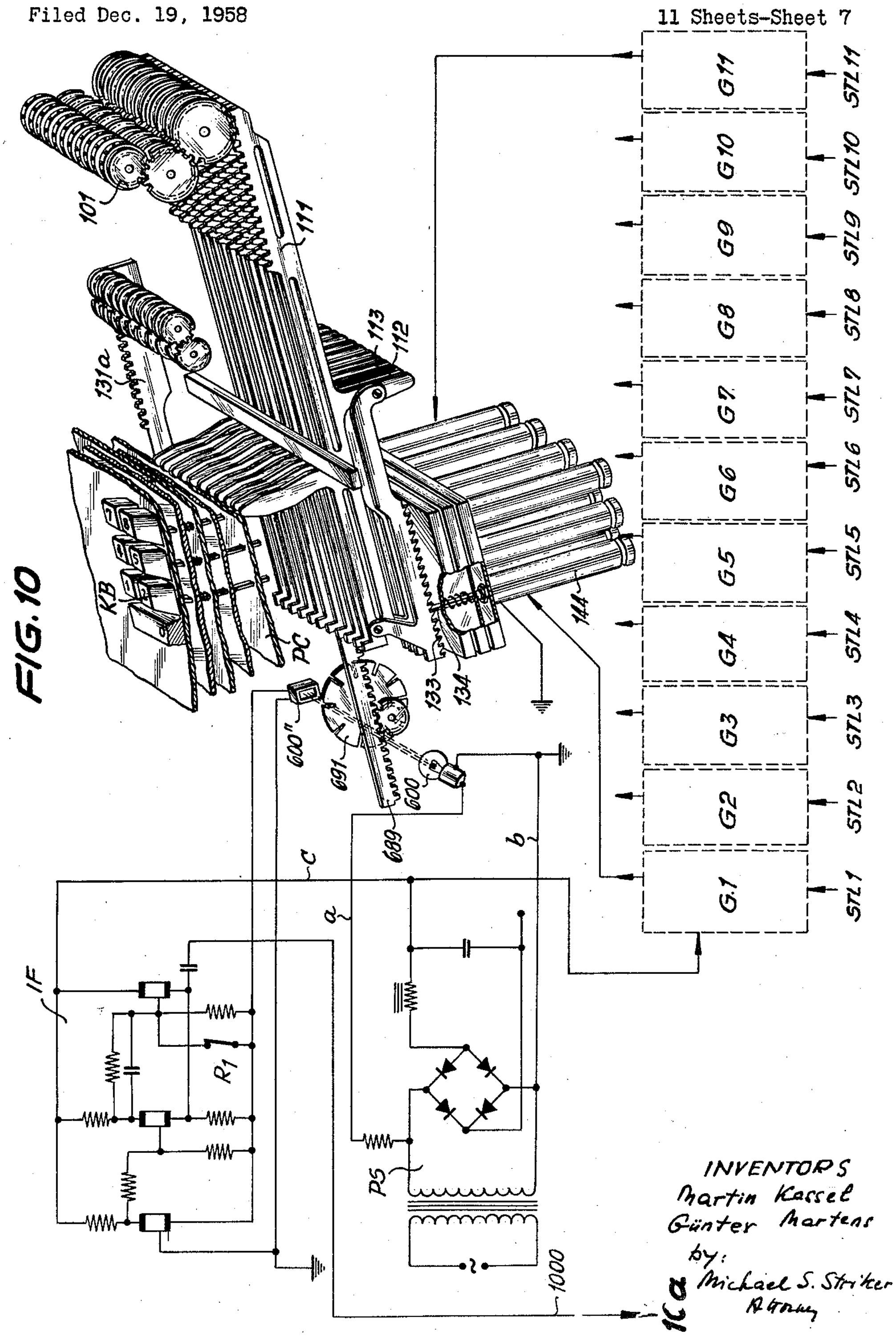

FIGS. 4*a* and 5*a* illustrate in front elevation and end view a modified form of the component illustrated by FIGS. 4 and 5;

FIG. 6 is a diagrammatic perspective view of another form of a component of the apparatus according to the invention;

FIG. 7 illustrates in diagrammatic and perspective manner still another modification of the component illustrated by FIG. 6;

FIG. 8 is an enlarged plan view of an element of the component illustrated in FIG. 7;

FIG. 9 is a block diagram illustrating a preferred embodiment of the apparatus according to the invention, this apparatus being suitable for deriving from a five-order electronic or magnetic accumulator the controls for a printing apparatus intended to reproduce the numerical value of numbers stored in the accumulator, as well as the complement values of those numbers;

FIG. 10 is a diagrammatic perspective view of an apparatus according to the invention, including a printing mechanism and the circuit diagram of pertaining electric components.

FIGS. 10*a*–10*d* are electric circuit diagrams of circuit components of counting devices showing their operative connections with the printing mechanism.

The above listed illustrations will also serve to explain the method according to the present invention.

Electronic accumulators are well known in the art. If multi-order numerical values are to be handled, the accumulator consists of a plurality of interconnected counting stages, usually in a number equal to the number of orders of the numerical values to be handled. The numerical values may be of the type occurring in a decimal number system or in any other number system. In any case the individual counting stage is capable of storing, for instance in a decimal number system, digits ranging from 0 to 9. In other number systems the arrangement is analogous. In either case, the stored numerical value in each stage is changed by the injection of a counting impulse into that stage, and after the injection of a number of such counting impulses a situation will be reached in which the storage or counting capacity of the particular stage is exhausted. When this occurs, which is usually the case when after the number 9 the 0 value is reached, an impulse is emitted from the particular stage which is usually a so-called 0 impulse, also called a carry-over or resetting impulse. When the accumulator is used in the normal manner for accumulating values, the last mentioned 0 impulse is used to carry-over one numerical unit to the next following counting stage of the accumulator. It is however necessary that in the case when values have to be transferred from the accumulator to an indicating or printing mechanism the 0 impulse is not transferred or carried over to the next following counting stage but is used as a control impulse for influencing the mechanical apparatus to which the above mentioned numerical values are to be transferred. A method and means for carrying out this utilization of 0 impulses in a transferring operation are described herebelow with reference to FIG. 9.

Figure 1:
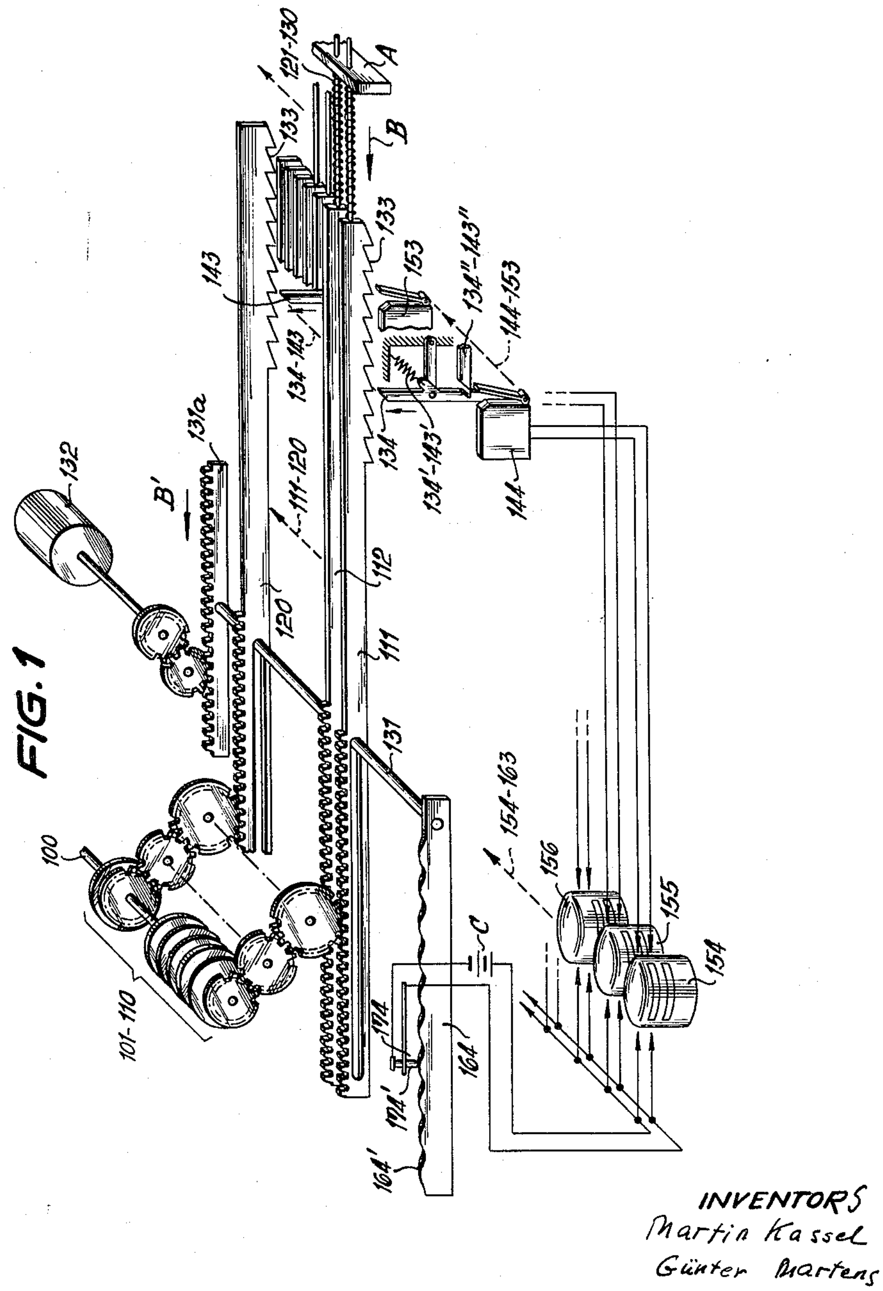
FIG. 1 is a diagrammatic perspective view of one embodiment of the apparatus according to the invention.

Referring now particularly to FIG. 1, a printing mechanism capable of handling ten-order numbers consists mainly of several type wheels 101 to 110, arranged for rotation about a common axle, not shown, the axis of which is indicated at 100. The type wheels are driven in known manner, via intermediate gears, by toothed bars 111 or 120, respectively, the so-called type wheel driving bars. Each type wheel with its associated intermediate gears and the pertaining driving bar constitutes one set of control elements of the mechanical apparatus in question. It is evident that the type wheels and gears are supported for rotation, and that the driving bars are guided for movement in longitudinal direction within a frame-work not shown. The individual driving bars 111 to 120 are continuously urged by springs for movement in the direction of the arrow B. This action is produced by springs 121 to 130 of which only two are shown and which are interposed between a portion A of the general frame and the rearward end of the individual driving bars. As can be seen in FIG. 1 each of the driving bars has a slot parallel to the forward toothed section thereof and a common collecting bar 131 is passed through all of the slots of all the driving bars 111 to 120. In the position shown which is not the position of rest of the whole arrangement the movement of the driving bars is stopped by the collecting bar 131 abutting against the rearward end of the slots of the bars. When it is desired to operate the printing mechanism as described above, the collecting bar 131 is moved in the direction of the arrow B by means of a drive motor 132 which via intermediate gears moves a toothed bar 131*a*, attached to the bar 131, in the direction of the arrow B'. It is clear that as the bar 131*a* moves the driving bars 111 to 120 are in a position to follow this movement under the action of the springs 121 to 130.

The bars 111 to 120 are each provided with stop teeth 133. Assuming that the mechanism is to be used for handling numerical values belonging to a decimal number system so that the type wheels 101 to 110 carry each the 10 digit symbols from 0 to 9, the number of stop teeth 133 is ten.

As can be seen from FIG. 1, each of the driving bars 111 to 120 has associated therewith arresting means comprising a pawl 134 movable in substantially vertical direction so as to be capable of engaging any one of the teeth 133 of the associated driving bar. The pawl 134 is associated with the bar 111 and similarly the other pawls are associated with the other bars, the last pawl 143 being associated with the bar 120. The various pawls 134 to 143 are respectively under the influence of pawl springs 134' to 143', respectively, which tend to pull the respective pawls into engagement with the teeth 133. However this movement is prevented by the engagement of holding pawls 134'' to 143'' with a corresponding notch in the lower part of the respective pawls 134 to 143. As shown in FIG. 1 the pawl 134 is held back in non-engagement position by the locking pawl 134'' against the action of the spring 134'. The arresting means further comprise for each one combination of a pawl and driving bar, a locking magnet 144 to 153, respectively, which when energized is capable of interrupting, by the attraction of its armature, the holding engagement between the corresponding holding pawl and the associated pawl. This means, that whenever one of the locking magnets 144 to 153 is energized the associated pawl 134 to 143, respectively will be released so as to engage any one of the teeth 133 of the associated driving bar 111 to 120 whereby the particular bar is arrested in that position which the particular bar occupies at the moment when the corresponding locking magnet is energized. In the position shown in FIG. 1, the actuation of the magnet 144 would cause the pawl 134 to engage the fourth tooth 133 of the bar 111 which corresponds to a position of the type wheel 101 which would result in indicating or printing the fourth numeral arranged thereon, counting from the numeral which is in indicating position when the apparatus is in position of rest.

The accumulator from which the numerical values are to be transferred to the printing apparatus is diagrammatically indicated by three counting stages 154, 155, 156 forming part of the whole accumulator comprising a series of such counting stages 154 to 163. The control impulses required for energizing the various locking magnets 144 to 153 are derived from the associated counting stages of the group 154 to 163, respectively. In order to obtain these control impulses from the electronic accumulator, electric impulses must be injected into the accumulator in such a manner that the numerical values stored in the respective counting stages are incrementally changed by a series of consecutive impulses, ten impulses in the present example, and which are generated by impulse generator means operatively connected with the printing apparatus. Accumulators of this general type are well known and usually composed of counting stages comprising each an electronic decimal counting tube, e.g., the type known as Philips E1T.

In the example illustrated by FIG. 1 the impulse generator means mainly consists of a generator bar 164 which is connected with the collecting bar 131 so as to move together with the latter under the driving action of the motor 132 as explained above. The generator bar 164 is provided with a series of cam portions 164', ten in number in this particular case, and a stationary pair of resilient contacts 174, the lower contact being equipped with a feeler piece 174' which slidingly travels over the consecutive cam portions 164'. It is therefore clear that as the generator bar 164 moves in the direction of the arrow B the contact pair 174 is moved into conductive position everytime when the feeler 174' rides on the crest of one of the cam portions 164'. The spacing between the individual cam portions 164' is such that the contact closing occurs everytime when during the rotation of the type wheels 101 to 110 one of the numerals arranged thereon is in indicating position, or, which means the same, anyone of the teeth 133 of any one of the bars is in register with the associated pawl 134 to 143, respectively. This means that synchronously with the passing of the numerals on the type wheels through the indicating positions thereof impulses are injected into the electronic accumulator stages 154 to 163 by the consecutively repeating closing of the contact pair 174, on account of the circuit connection between these contacts, including a battery C and conductors which permit to inject each of said impulses simultaneously into all of the counting stages of the accumulator. As has been explained above, the accumulator is assumed to contain therein an accumulated or stored numerical value. Therefore the injection of the consecutive impulses created by the generator means as described, will change the numerical value stored in each one of the counting stages of the electronic accumulator so that, depending upon the composition of the numerical value initially stored therein, at certain times the counting capacity of one or the other counting stage will be exhausted so that then the so called 0 impulse is emitted from the particular counting stage where this exhaustion of storage or counting capacity occurs. It is to be understood that provisions are made to prevent these 0 impulses to act as carry-over or re-setting impulses as in normal counting procedure; instead these 0 impulses are then injected as control impulses through the connecting lines shown in FIG. 1 into the associated locking magnets 144 to 153, respectively. Consequently, whenever one of the driving bars 111 to 120 is stopped by one of those control impulses mentioned above the corresponding type wheel will be arrested in a position in which a numeral is in indicating or printing position which is equal to the complement of the digit which was initialy stored in the associated counting stage of the accumulator. It can also be seen, that no matter which one of the various driving bars 111 to 120 has been stopped in the above described manner, the other bars are free to proceed in their movement in the direction of the arrow B until they are stopped in a proper position.

As a rule it is not desired that the type wheels are stopped in a position which makes the complement numbers to the stored numbers appear in indicating or printing position. Therefore it would be advisable to arrange the numerals on the type wheels in reversed order so that during their rotation they so-to-say count backwards. However, this can be avoided by other means. In the above description it has been assumed that the electrical impulses injected from the generator means into the accumulator influence the latter in a forward counting manner, i.e., additively. If it is, however, desired to have the numerals on the type wheels arranged in the normal way, that is in forward counting arrangement with respect to their direction of turn, then it is possible to arrange matters in such a manner that the electrical impulses furnished by the generator means are injected into the electronic accumulator in backward counting sequence, i.e., subtractively. In this case the re-setting or 0 impulses will be delivered from the electronic accumulator or from the individual counting stage thereof at a moment when as many impulses have been injected into the accumulator as correspond to the regular numerical value of the figure to be indicated or printed, so that the type wheels will be arrested in positions which correspond to that regular numerical value and not to the complement thereof.

In the present example, after the bar 131*a* has been moved through a complete stroke which causes a sequence of ten control impulses to be generated by the generator means 164, 174, a sequence of ten impulses has been injected into all of the counting stages 154 to 163 of the accumulator so that the originally stored numerical value is reestablished therein. At the same time the originally stored numerical value has been completely transmitted to the series of type wheels 101 to 110. Each one of them is in a position in which each one of the digits forming the numerical values stored in the accumulator is represented in the same order sequence by identical numerals or complement numerals on the various type wheels and each of the respective numerals is now in indicating position. If desired, the entire ten-order number can be printed from the type wheels, for instance by swinging the type wheels onto a platen in known manner. Hereafter the toothed bars 111 to 120 and simultaneously the type wheels 101 to 110 are returned to their initial positions, respectively, by reversing the driving direction of the motor 132. During the return movement of the driving bars also the pawls 134 to 143 are returned to their normal position in a way known generally in the art and therefore not requiring a detailed description. It may suffice to state that the slanting portions of the teeth 133 will force down the associated pawl 134 to 143, respectively, so that the associated holding pawl 134'' to 143'', respectively, will engage the holding notch of the corresponding pawl.

Figure 2:
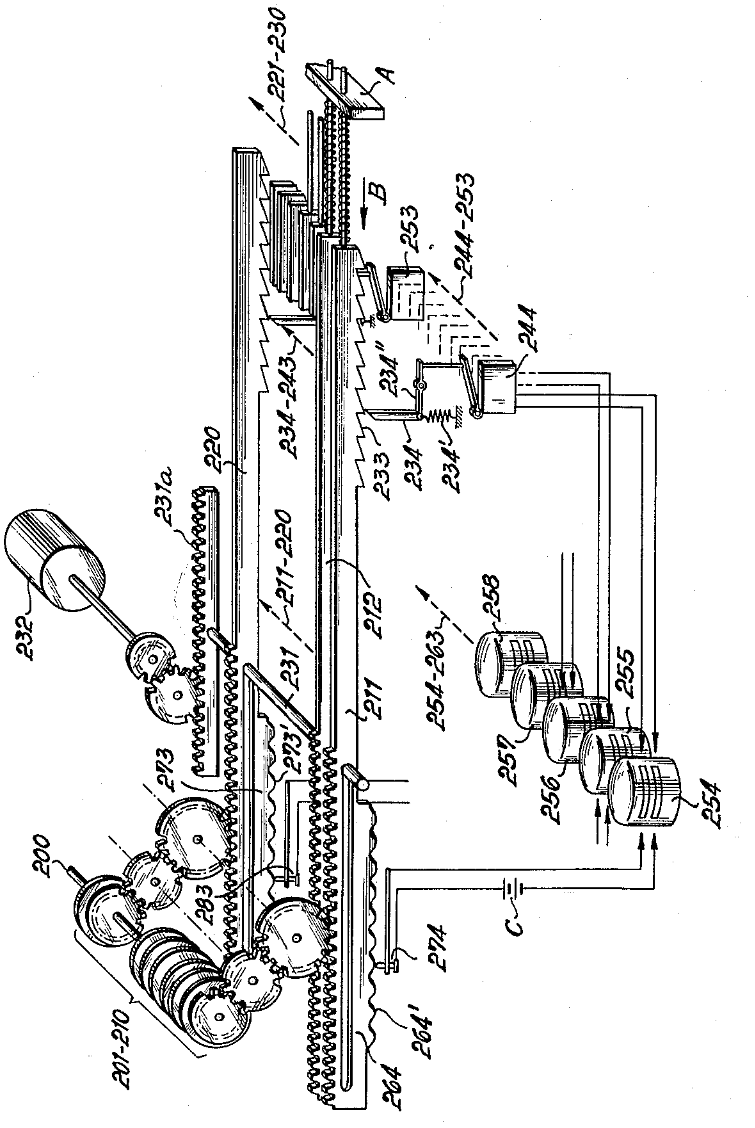
FIG. 2 is a similar perspective diagrammatic illustration of a modified embodiment of the apparatus according to the invention.

The modified embodiment illustrated by FIG. 2 generally resembles the embodiment described with reference to FIG. 1. Therefore all those parts which are equal or equivalent to the components of the embodiment of FIG. 1 are designated by the same numerals except that the individual numeral is increased by "100." Therefore, e.g., the first driving bar marked 111 in FIG. 1 is identified by the numeral 211 in FIG. 2. The design of the pawls 234 slightly differs from that of the pawls 134 in FIG. 1 since the pawl 234 is carried by the rocker arm 234'', being under the action of a spring 234' tending to keep the pawl out of engagement with the teeth 233, while the opposite end of the rocker arm 234'' is connected to the armature of the corresponding one of the locking magnets 244 to 253, respectively. More important is the difference consisting in the fact that instead of one single generator bar 164 and one pair of contacts 174 connected jointly or in parallel with all of the individual counting stages 154 to 163, now everyone of the driving bars 211 to 220 is provided with a generator portion 264 to 273, respectively having a series of cam portions 264' to 273', respectively, a pair of contacts 274 to 283, respectively, being in operative connection with the above mentioned cam portions. Consequently each one of the contact pairs 274 to 283, respectively, is individually connected with only one of the counting stages 254 to 263, respectively, associated therewith. It is readily understandable that the operation of this arrangement is entirely analogous to that set forth above with respect to the embodiment of FIG. 1.

Figure 3:
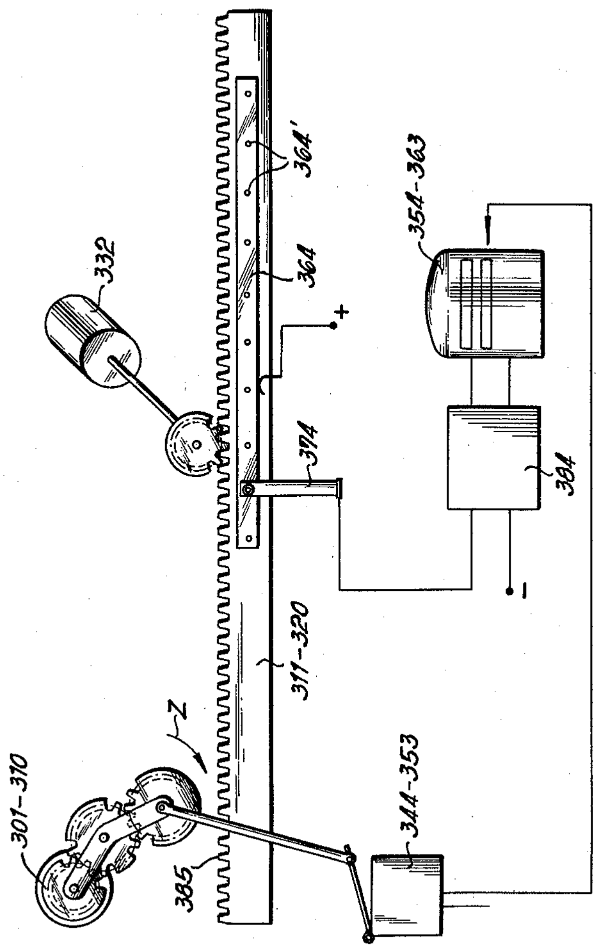
FIG. 3 is a diagrammatic partial illustration of certain components characteristic of another embodiment of the invention.

Supplementing the above description of one embodiment of the invention and a modification thereof, an arrangement will now be described in reference to FIG. 3 which serves to move the type wheels in a somewhat different manner into their indicating or printing positions in accordance with a regular, non-complementary counting procedure. The parts shown in FIG. 3 and corresponding or being equivalent to those shown in FIGS. 1 and 2 are designated by numerals which differ from the numerals used in FIG. 1 by the addition of "200." For instance the driving bars in FIG. 3, corresponding to the driving bars 111 to 120 in FIG. 1, are indicated by numerals 311 to 320. However, in this case every one of the driving bars 311 to 320 carries on one side a contact bar 364 connected to a source of electrical energy and being provided with projecting contact points 364' spaced from each other in the same manner as the cam portions 164' in FIG. 1. A stationary pickup contact 374 is so positioned that during the travel of the bars 311 to 320 the respective contact points 364' will consecutively pass by and engage the stationary contact 374 whereby a circuit through an impulse forming stage 384 is closed from where the impulse generated by the closing of the contact between the elements 364' and 374 is injected into the associated one of the counting stages 354 to 363, respectively, of the pertaining electronic accumulator. The control impulse derived from the individual counting stage is transmitted to the associated electromagnet 344 to 353, respectively, which in turn actuates the type wheel arrangement. As can be seen from FIG. 3 energization of one of the magnets 344 to 353 will cause the intermediate gears of the associated type wheel 301 to 310 to be pulled in direction of the arrow Z into engagement with the corresponding teeth 385 of the associated driving bar. Consequently as the movement of the particular driving bar under the drive of the motor 332 proceeds after the electromagnet has caused the engagement between the type wheel arrangement and the particular driving bar, the respective drive wheel will be turned into a position which corresponds to the amount of travel of the particular driving bar after the above mentioned moment of engagement. In this manner again the individual type wheels will be positioned in such a manner that in the course of the movement of the pertaining drive bars the individual type wheels are in the desired indicating or printing position. Then, if desired, the printing operation can be carried out as mentioned above. Hereafter the engagement between the type wheel arrangement and the driving bars is eliminated as the electromagnets are de-energized, so that the type wheels as well as the driving bars can be returned to their starting or 0 position in a generally known manner, particularly the latter by reversing the direction of rotation of the motor 332.

It should be noted that it is also possible to position the type wheels for indicating or printing the regular numerical value initially stored in the accumulator, by having the electronic accumulator count backwards when supplied with the electrical impulses delivered by the impulse generator means operated by the type wheel mechanism as described above. In this case a resetting or 0 impulse is delivered every time when the counting within one counting stage passes from the value 0 to 9, resulting in a resetting impulse which as stated above is used in the frame-work of this invention as a control impulse for stopping or arresting the control elements of the type wheel apparatus. Since for obvious reasons this control impulse is offset in time by one impulse against the regular numerical value stored in the particular counting stages, it is necessary to suppress one step of the stepwise or incremental movement of the driving bars. For this reason, an arrangement can be made for the driving bars to be in their normal or starting position one step backward as compared with the position used in the above described embodiments. In other words, the driving bars when in position of rest are in such a position that they have to make at least one step in order to get into the position corresponding to the value of "0" associated with the corresponding 0 position of the associated drive wheel.

It is to be mentioned at this instance, that the above mentioned requirement of eliminating the possibility of one counting stage, the storage or counting capacity of which has been exhausted, transferring the 0 impulses as a carry-over impulse into the next following counting stage of the accumulator, can be complied with very simply by arranging in the printing mechanism a suitable switch means which upon the start of the transferring operation interrupts the connections between the consecutive counting stages of the accumulator and instead, if necessary, establishes the connection between the counting stages and the arresting means.

While the above described examples of impulse generator means fundamentally solve the problem of generating impulses synchronously with the stepwise or incremental movement of the drive bars, it is well possible that the particular arrangements shown and described could cause disturbances or failure because the rapidly operated contacts 174, 274 or 374, may tend to bounce so that the disturbing consequences of such bouncing would have to be suppressed by means of special switching devices or methods. Moreover, the use of metallic contacts could cause other difficulties due to changes in the contact resistance for instance due to oxidation or contamination of the contact tips.

In order to overcome these difficulties all metallic contacts and their operation are advantageously eliminated by providing other means for generating the electric impulses required.

One suitable way is to generate the electrical impulses by magnetic means.

Two modifications of such a magnetic impulse generator are illustrated by FIGS. 4, 5 and FIGS. 4*a*, 5*a*. Referring to FIGS. 4 and 5, a generator bar 489 is used instead of the generator bar 164. The bar 489 consists of ferro-magnetic material and is provided with a series of notches defining between each other pole tips 489'. Preferably, the flanks of the notches are formed in accordance with an exponential curve. A C-shaped magnet structure, preferably including a permanent magnet portion 488 is positioned so that the bar 489 can be moved along a slot in the lower portion of the magnet frame 486 as can be seen in FIG. 5. The opposite end of the C-shaped frame 486 terminates in a similar pole tip 486'. As can be seen from FIGS. 4 and 5 the bar 489 if moved in longitudinal direction along the slot of the magnet will pass through a sequence of positions in which the pole tip 486' is opposite one of the notches, and through positions where the stationary pole tip 486' is in register with one of the pole tips 489' of the bar. It is therefore evident that every time when pole tips are in register with each other as just stated, the magnetic flux in the magnet is at a maximum while it is substantially reduced while one of the notches is opposed to the tip 486'. A coil 487 is mounted around the yoke portion of the magnetic frame 486. Therefore the various changes of flux in the magnet are bound to induce electric impulses in the coil 487 which can then be used as electrical impulses to be injected into the accumulator.

It will be noted that FIG. 4 shows that the spacings between consecutive pole tips 489' of the generator bar 489 are not equal. For instance at the right hand end of the bar 489 the spacing $a_0$ is considerably smaller than the spacing $a_9$ at the left hand end of the bar. It is of quite some importance in many cases to space the pole tips 489' not equi-distantly for the following reasons. As is evident from the above description of the operation of the whole arrangement it is essential that the control impulses introduced from the respective counting stages of the accumulator into the locking magnets or other electromagnets acting on the type wheel arrangement are synchronous with the passing of the various numerals of the type wheels through the indicating or printing position thereof so that the particular type wheel arrangement or set of control elements thereof are stopped exactly at the right moment. It has to be borne in mind that first of all a time delay factor is typical of the electromagnets used in the arrangement because they require a certain amount of time before the respective pawl will effectively engage the respective tooth 133 or 233 in the embodiments of FIGS. 1 and 2. This delay factor may be taken care of by correspondingly offsetting the generator bar with respect to the associated teeth of the driving bar. However in addition, it must be taken into consideration that upon the start of the movement of the driving motor 132 or 232, the speed of movement of the associated driving bars necessarily will increase from 0 to a certain maximum, thus the time required for the individual driving bars to move between say the position "1" and "2" will be different from the time required to move between the positions "5" and "6." Thus, the different spacing of the pole tips 489' will compensate for the differences in the moving speed of the associated driving bar. In certain cases, the arrangement may have to be modified, for instance if the movement of the driving bars is not only accelerated after the start but is decelerated after reaching a maximum and before the bar comes to a full stop. In that case the non-equidistant spacing between the pole tips 489' can be chosen accordingly.

A modified version of the magnetic impulse generator of FIGS. 4 and 5, is illustrated by FIGS. 4*a* and 5*a*: in this case the magnet frame 486''' does not carry a coil in which electrical impulses are induced. The generator bar 489 is not shown in FIGS. 4*a* and 5*a* because it can be used in the same manner also in this modified version of the magnet impulse generator. The induction coil 487 is not used in this modified version because evidently the induced impulse depends also upon the speed of the movement of the bar 489 because the speed of change of the magnetic flux controls the induction of electric current in the coil. The arrangement according to FIGS. 4*a* and 5*a* is based on the fact that the electric resistance of certain semi-conducting materials as for instance bismuth, germanium, and especially that of $A^{III}B^{V}$ compounds, as for instance indium antimonide depends on the force of the surrounding magnetic field. Based on this fact, a small plate 486'' preferably of indium antimonide is arranged according to the invention on the pole tip 486' as can be seen in FIGS. 4*a*, 5*a*. If preferably a ohmic conductive impedance is arranged on either one of the two opposite surfaces of this crystal and if then these impedances are connected to the poles of a source of direct current over a load 487' a very substantial impulse can be tapped off the load 487' when the generator bar 489 is moved through the slot of the magnet yoke 486'', 488'. This is due to the fact that during the movement of the bar the magnetic flux is very substantially altered between the positions in which the plate 486'' is opposite one of the notches of the bar 489 and the positions when the plate 486'' is opposite to one of the pole tips 489'. This alteration of the magnetic flux results in a considerable alteration of the resistance of the crystal plate 486''. In this way fluctuations of tension are caused in the load 487' the amplitude of these fluctuations being independent of the speed of the generator bar 489 passing through the slot of the magnet. The impulses thus generated are then supplied as electrical impulses to the corresponding counting stage of the electronic accumulator.

Electrical impulses for the purposes of this invention may also be generated by impulse generator means based on a photo electric device. FIGS. 6 to 8 illustrate two versions of this type of impulse generator means.

As can be seen from FIG. 6, a generator bar 589 may be used instead of any one of the other generator bars described above. The bar 589 is provided with a series of slots 589' which are not equidistantly spaced from each other for the reasons stated above. The bar 589 is arranged to move in such a manner that the individual slots 589' consecutively pass across a beam of light 600' furnished by a light source 600 and directed at a photo electric cell 600''. It is evident that every time when one of the slots passes through the beam of light 600′ an impulse will be generated in generally known manner by the photo cell 600″. This impulse can then be used as the electrical impulse to be injected into the electronic accumulator.

In the modified version of a photo electric impulse generator means illustrated by FIGS. 7 and 8 a generator bar 689 is used which has a set of gear teeth 689′. These teeth mesh with a small gear 690 mounted on a shaft which carries a disc 691 provided with a number of slots 691′. As can be seen the slots 691′ are circumferentially spaced from each other non-equidistantly for the same reasons which have been explained above. It is evident that by moving the generator bar 689 conjointly with any one of the driving bars the disc 691 will be caused to rotate. The disc 691 is so located that the slots 691′ consecutively pass across the beam of light 600′ coming from the source of light 600 and directed at a photo electric cell 600″. In the same manner as in the example illustrated by FIG. 6 the passing of any one of the slots through the beam will cause the generation of an impulse in the cell 600″ which impulses are then fed into the electronic accumulator as described above.

It does not appear to be necessary to describe in detail the method according to the invention which has been basically stated at the outset of this specification and is implicitly explained by the description of the operation of the various embodiments illustrated by the drawings. However it is clear that the method as stated and described can be carried out by various types of apparatus and not only by the apparatus described in various embodiments above.

Moreover it should be understood that the method and apparatus described above can be modified and advantageously adapted to various requirements by using for the various electro-magnets provided in the above described arrangements the particular type of electro-magnet arrangements which are described in the copending application Serial No. 731,011. The special electro-magnet arrangements described in this just mentioned application are particularly suitable for use in connection with the arrangement according to the invention because usually the impulses derived from the electronic accumulator are comparatively short and weak so that the highly efficient action of the electro-magnet arrangement according to the copending application will serve to greatly improve the reliability and efficiency of the arrangement according to the invention.

Moreover it should be noted, that the arrangement and method according to FIGS. 1 and 4–8 can be advantageously combined with the method and apparatus described with reference to FIG. 9. By using such a combination the advantage is obtained that without changing the standard or conventional arrangement of the type wheel mechanism, the transferring operation concerning certain numerical values stored in the electronic accumulator can be carried out in a simple manner in two alternative ways, namely either in such a manner that the numerical values stored initially in the electronic accumulator are made to appear in the type wheel mechanism in the same form or in the form of the complementary values based on that initially stored numerical value.

In the arrangement illustrated by FIG. 9 only those elements or components are shown which appear to be necessary for explaining and understanding this arrangement. An electronic accumulator 10 adapted to handle five-order numbers of a 10-digit number system comprises five counting stages or order units indicated by numbers 11–15. An impulse forming device 4 is provided for receiving from a suitable source counting impulses and for transmitting them into the accumulator 10. Impulse forming devices are known, e.g., in the form of a monovibrator which upon application of a counting impulse delivers to the electronic accumulator or counter a precisely defined impulse of predetermined amplitude and duration. Such impulse forming devices are described, e.g., in "Waveforms," published 1949 by McGraw-Hill Book Co., Inc., in section 5.5, pages 166–171. The impulse forming device 4 and the individual counting stages 11–15 are interconnected by a plurality of switches 51–55. When these switches are in open position as shown, then it is impossible for counting impulses to reach any one of the counting stages 11 to 15 or for any one of these stages to transmit carry-over impulses from stage to stage. The individual counting stages 11–15 are connected with a common line 10*a* which will be described later. On the other hand, every one of the counting stages 11–15 is associated with a locking magnet 31–35, respectively, adapted to arrest the corresponding control elements of the associated order unit of the mechanical printing or indicating apparatus, respectively, as described above in reference to FIGS. 1, 2 and 3. Interposed between each of the counting stages 11–15 and the associated locking magnets 31–35, respectively (cooperating with locking means illustrated, e.g., in FIG. 1 and shown next to 31 in FIG. 9) are gate circuits 21–25, respectively, which, depending upon their blocking or non-blocking condition will open or close a path between the individual counting stage and the associated locking magnet. Every one of the gate circuits 21–25 has a control input and all of these inputs are connected to a common supply line 10*b*. A switch 73 at one end of the line 10*b* is arranged for providing the line 10*b* with potential from either one of two different sources as will be explained further below.

It is to be understood that the accumulator is adapted to perform in two different ways. It may be operated as an accumulator for accumulating numerical values stored in the various counting stages 11–15. In this case, counting impulses are injected into the impulse transforming device 4 while all the switches 51–55 are in closed position. At the same time the switch 73 is in the position shown in the drawing in which case the line 10*b* is connected with a source of potential feeding a negative voltage of 10 volts into the gate circuits 21–25 with the result that all these gates are caused to be in blocking condition so that the carry-over impulses occurring in the accumulator 10 are unable to cause any effect on the locking magnets 31–35.

The accumulator 10 can however be operated in a second manner in which case all the switches 51–55 are moved into open position and the switch 73 is moved into the position in which the source of supply mentioned above is disconnected from the gate circuits. The line 10*b* is now connected with the line 71*a* which will be explained further below.

In the second mode of operation of the accumulator 10 the whole arrangement is adapted for transferring any numerical values stored in the counting stages 11–15 into the mechanical apparatus connected therewith, or more specifically the control elements of the respective or associated order units of that apparatus.

An impulse generator means 72 is associated and operatively connected with the control elements of the mechanical apparatus. The function of that impulse generator is such that with every step of the step-wise moving control elements (as shown diagrammatically next to magnet 31 in FIG. 9) of any one of the order units of the mechanical apparatus, one impulse is generated in the impulse generator 72. Preferably this impulse generator 72 may be a photo-electric impulse generator device of the types described above in reference to FIGS. 7 and 8 and as shown next to block 72 in FIG. 9, and with every step of the type wheels a change in the illumination of the photo-cell may be produced thus generating a corresponding impulse.

The control impulses from the generator 72 are applied to the rest of the arrangement by means of a selector switch 78 with which the generator 72 is connected. The selector switch 78 can be moved between two positions, preferably mechanically, one position being used when the true or regular numerical values are to be transmitted to the mechanical apparatus from the accumulator 10, the other position being used when the complement values of the stored values are to be transmitted to the mechanical apparatus. In the first case the switch 78 opens a gate 77, while in the second case the gate 76 is opened.

The gate 76 is connected by a conductor 76$a$ and via a diode 76$b$ to an impulse forming device 63 the output of which is connected with the above mentioned supply line 10$a$ of the accumulator. The operation of this particular circuit will be described further below.

The gate 77 is connected with another switching means which may consist of a flip-flop device 71 which is capable of assuming two stable positions depending upon impulses injected into the flip-flop. The flip-flop 71 has one input connected with the gate 77 and a second input connected with a generator 64 described further below. The flip-flop has two outputs, one of which is connected by the conductor 71$a$ to the above-mentioned switch 73. The other output leads to a multi-vibrator 70 which in turn is connected with a shifting impulse generator 75 which may be of any conventional type capable of responding to an input impulse by delivering a shifting impulse and which serves to inject shifting impulses into a shift register 61 composed of counting stages 610–619. The individual counting stages 610–619 are respectively connected with a common conductor 69 which leads to delay circuit 62 and from there through a second diode 62$a$ to the above-mentioned impulse forming device 63.

For the sake of simplicity first the case of transmitting true or regular values is described below.

It can now be seen that in the case of transmitting the regular or actual numerical values stored in the counting stages 11–15 of the accumulator 10 the first impulse furnished by the impulse generator 72 upon the first step of the control elements of the associated mechanical apparatus will pass through the gate 77 and arrive at the flip-flop 71 whereby the latter is caused to swing into one of its stable positions in which the multi-vibrator 70 is enabled to oscillate in a not stable condition and to generate impulses the frequency whereof is preferably approximately 10 kilocycles. These impulses are applied as shifting impulses to the above-mentioned electronic shift register 61 via a shifting impulse generator 75 which is connected to the first counting stage 610 of the register 61. Evidently the register 61 serves as a read-out device and has ten elements. Preferably the register 61 is constructed in a generally known manner as a chain of magnetic counting stages having each a single coil. In preparation of the operation of the arrangement the auxiliary generator 68 is actuated by mechanically closing the starting switch 74 so that the first stage 610 of the register 61 can be pre-energized by the generator 68. In this manner the magnetic condition of the first stage 610 is changed by the impulse coming from the generator 68. By the arrival of a control impulse from the impulse generator 72 through the above described means, the magnetic condition of the first stage 610 is now shifted in a generally known manner in ten steps from the stage 610 to the stage 619 of the register 61. Upon completion of the tenth step along this register 61, an impulse is emitted from the last stage 619 and returned over the conductor 61$a$ to the flip-flop 71. Hereby the latter is caused to swing into its opposite stable position whereby the connection to the multi-vibrator 70 is blocked. However, simultaneously the same impulse arrives also at the second (auxiliary) impulse generator 64 in which it is, as far as necessary, reformed and provided with the amplitude required to make this impulse suitable for being injected into one of the counting stages of the register 61. The resulting impulse is transmitted from the generator 61 via conductor 64$a$ to the second stage 611 of the register 61 as will be explained later.

With every shift of a signal from one of the counting stages 610–619 to the next following one, an impulse is released and injected into the common delivery line 69. Consequently, the first impulse delivered by the impulse generator 72 will cause a sequence of ten consecutive impulses to be injected into the conductor 69. These impulses are then supplied with a delay of approximately 30 μsec. caused by the delay circuit 62, via a diode 62$a$ to the impulse forming device 63. From here these consecutive impulses, after having been properly formed, are injected simultaneously via the conductor 10$a$ into all of the counting stages or order units 11–15 of the accumulator 10. Since the switch 73 is, as mentioned above, now in its lower position connecting line 10$b$ with line 71$a$, the flip-flop 71 is capable, during the time when the above mentioned shifting impulses are delivered to the register 61, to apply a suitable voltage to the gates 21–25 so that these gates are changed to their blocking position whereby any carry-over pulses from any one of the stages 11–15 are prevented from reaching the respectively associated locking magnets 31–35. However, the last shifting impulse of the register 61, derived from the last stage 619, reaches via the above-mentioned line 61$a$ the flip-flop 71 whereby the flip-flop is caused to swing into its opposite stable condition so that now the gates 21–25 obtain a voltage by which they are changed back into unblocking condition. Now in case any one of the stages 11–15 should be in a position of furnishing a carry-over impulse, then such impulse would find the path to the particular locking magnet open. It should be borne in mind that the read-out impulses coming from the register 61 are delayed by the delay circuit 62 in such a manner that the gates 21–25 will be already in non-blocking condition when the possibly furnished carry-over impulse from one of the stages 11–15 arrives. It can be seen from the above that as a result of the first ten impulses coming from the shift register 61 all those locking magnets 31–35 will be actuated which are associated with an order unit or stage of the accumulator 10 which happens to contain the numerical value "0" and therefore are in a position of furnishing a carry-over impulse.

As has been mentioned above, the last impulse emanating from the stage 619 travels via the auxiliary impulse generator 64 and line 64$a$ to a second input of the second stage 611 of the register 61. Hereby the magnetic condition of this stage is changed whereby the register 61 is prepared for the arrival of the next impulse coming from the impulse generator 72. When a second impulse is generated in the generator 72 by the second step of the control elements, this impulse arrives via gate 77 at the flip-flop 71 and again changes the condition of the latter so as to permit passage of this impulse to the multi-vibrator 70 with the result that again a shifting impulse is injected into the register 61. At the same time a potential is applied from the flip-flop 71 to all of the gates 21–25 with the effect that all these gates are changed again to blocking position. Since the register 61 has been prepared by the above mentioned change of magnetization of the second stage 611, now only a series of nine impulses are released from the register 61, the last one being furnished by the last stage 619. These nine consecutive impulses travel via line 69 again to the delay circuit 62 and the impulse forming device 63 to line 10$a$ and from there simultaneously into the five elements 11–15 of the accumulator. Besides, the impulse from the last stage 619 travels via the auxiliary generator 64 and line 64$a$ also again to the stage 611 of the register 61 with the same effects as mentioned above for the first application of such an impulse.

It will be understood that since now only nine consecutive impulses are applied to the accumulator 10, the individual numerical values stored in the individual stages 11–15 will be reduced after the nine impulses injected via line 10$a$ each by one numerical unit. All those stages or order units of the accumulator 10 which originally had stored therein a numerical value equal to "1" are, during this operation, in a position to actuate the associated locking magnet by means of the carry-over impulse caused by the last impulse of said nine-impulse series. Consequently, the corresponding control elements of the attached mechanical apparatus will be arrested in a position corresponding to the numerical value "1." The while procedure repeats now with every further step of the stepwise moving control elements or type bars of the printing apparatus so that with the tenth step of these control elements, i.e., as a consequence of the ninth 9-impulse series the numerical value "9" is transmitted from the appropriate order units or stages of the accumulator 10 to the control elements of the mechanical or printing apparatus. It is now only necessary to provide for another series of nine impulses in order to restore in the individual stages of the accumulator 10 the numerical values that had been stored therein before the beginning of the transmitting operation.

While it has been mentioned above in what manner the impulse generator 72 has to function in synchronism with the stepwise movement of the control elements of the mechanical apparatus or with the stepwise movement of the type wheels of the printing apparatus, details of which are explained and described above, it is to be mentioned here that the required eleventh impulse is to be supplied to the flip-flop 71 from a source A, not described in detail in this specification, but which may be any suitable impulse source that may be connected with the present arrangement and may be mechanically actuated at the termination of the ten steps of the control elements of the mechanical apparatus. For instance, this impulse may be released simultaneously with the return movement of the control elements or type bars into their original position after the completion of the ten forward steps thereof. The eleventh impulse injected into the flip-flop 71 operates exactly as the previous impulses furnished by the impulse generator 72 so that an eleventh sequence of nine impulses are produced in and furnished by the shift register 61.

While the above description of the operation of the arrangement refers to that mode of operation in which the regular numerical values stored in the accumulator 10 are to be transferred without change into the mechanical apparatus, the following description refers to the other case in which, after switching the selector switch 78 into its second position and opening the gate 76, the complement values of the above mentioned stored numerical values are to be transferred It can be seen from the diagram of FIG. 9 that now every forward step of the control elements of the mechanical apparatus produces through the generator 72 again an impulse which, however, is supplied via the gate 76 and the line 76a directly to the impulse forming device 63. From here again all the counting stages 11–15 of the accumulator 10 are simultaneously provided with an impulse.

It is to be understood that the flip-flop 71 must be actuated before the start of this operation of the arrangement by a preliminary impulse in such a manner that the gates 21–25 are in non-blocking condition. This primary or preparatory impulse is furnished to the flip-flop 71 by operation of a separate switch 74 which may be operated by suitable mechanical means and maintains the applied voltage in the flip-flop 71 in such a manner that the gates 21–25 remain in their non-blocking condition throughout the operation of the arrangement.

With the first step of the stepwise moving control elements of the mechanical apparatus all those control elements are now arrested in their position by the locking magnets 31–35, respectively, which happen to be associated with a counting stage of the accumulator 10 in which a numerical value equal to "9" had been stored. It will be noted that the first step of said control elements or the type bar or type wheel corresponds to a position thereof which corresponds to the numerical value "0," which is the complement value of "9." With the second step of the control elements all those locking magnets are actuated and simultaneously those control elements are arrested which are associated with an element of the accumulator 10 in which a numerical value equal to "8" had been stored. The procedure during the next following steps of the control elements is analogous. Upon the tenth step of the control elements or type bars the printing or indicating means or wheels are in the position which corresponds to the numerical value "9." From this it can be seen, that the mechanical elements of the associated apparatus are hereby set or a printing process is hereby controlled in such a manner that numerical values are caused to appear which are always, in each order of the particular multi-order number, the complement of the actual numerical value with respect to the numerical value "9" of that number, respectively, which is stored in the individual units of the accumulator 10.

It will be seen that substantially the whole arrangement according to the invention requires, if compared with standard counting or indicating and printing arrangements, comparatively few additional components or parts. Essentially the additional investment is characterized by the addition of the shift register 61 and the pertaining impulse generator and switching means. The addition of these components results in the most welcome possibility of being able to transmit in the simples possible manner from an accumulator or calculating machine alternatively either the actual numerical values stored therein, or their complement values, to a pertaining mechanical counting, indicating or printing apparatus.

In addition the arrangement according to the invention introduces the advantage that in either case the value "0" is transmitted to the mechanical apparatus already with the first step of the control elements thereof.

It should be realized that the time delay occurring between an impulse furnished by the impulse generator 72, and the corresponding actuation of one or more of the locking magnets 31–35, can in no case amount to more than the time required for a sequence of 10 pulses. This is already the most unfavorable case. Assuming a pulse frequency of the multi-vibrator 70 of 10 kilocycles the delay cannot amount to more than one msec. This delay is very well compatible with the requirements existing in the operation of a mechanical indicating or printing apparatus.

In the following an example in actual figures is drawn up to show in what manner a numerical value of five orders is transferred, without conversion into its complements, to an associated or connected mechanical apparatus.

| | | | | | | | |
|---|---|---|---|---|---|---|---|
| | | 5. | 4. | 3. | 2. | 1. | Decimal Orders |
| Accumulated and Stored Number. | | 3 | 5 | 7 | 0 | 1 | |
| 1st step (10 impulses): | 1. | 4 | 6 | 8 | 1 | 2 | Type Wheel Position "0" |
| | 2. | 5 | 7 | 9 | 2 | 3 | |
| | 3. | 6 | 8 | 0 | 3 | 4 | |
| | 4. | 7 | 9 | 1 | 4 | 5 | |
| | 5. | 8 | 0 | 2 | 5 | 6 | |
| | 6. | 9 | 1 | 3 | 6 | 7 | |
| | 7. | 0 | 2 | 4 | 7 | 8 | |
| | 8. | 1 | 3 | 5 | 8 | 9 | |
| | 9. | 2 | 4 | 6 | 9 | 0 | |
| | 10. | 3 | 5 | 7 | 0 | 1 | Locking Magnet of 2nd Order Actuated |
| 2nd step (9 impulses): | 1. | 4 | 6 | 8 | 1 | 2 | Type Wheel Position "1" |
| | 2. | 5 | 7 | 9 | 2 | 3 | |
| | 3. | 6 | 8 | 0 | 3 | 4 | |
| | 4. | 7 | 9 | 1 | 4 | 5 | |
| | 5. | 8 | 0 | 2 | 5 | 6 | |
| | 6. | 9 | 1 | 3 | 6 | 7 | |
| | 7. | 0 | 2 | 4 | 7 | 8 | |
| | 8. | 1 | 3 | 5 | 8 | 9 | |

| | | | | | | | |
|---|---|---|---|---|---|---|---|
| | 9. | 2 | 4 | 6 | 9 | 0 | Locking Magnet of 1st Order Acuated |
| 3rd step (9 impulses): | 1. | 3 | 5 | 7 | 0 | 1 | Type Wheel Position "2" |
| | 2. | 4 | 6 | 8 | 1 | 2 | |
| | 3. | 5 | 7 | 9 | 2 | 3 | |
| | 4. | 6 | 8 | 0 | 3 | 4 | |
| | 5. | 7 | 9 | 1 | 4 | 5 | |
| | 6. | 8 | 0 | 2 | 5 | 6 | |
| | 7. | 9 | 1 | 3 | 6 | 7 | |
| | 8. | 0 | 2 | 4 | 7 | 8 | |
| | 9. | 1 | 3 | 5 | 8 | 9 | No Magnet Actuated |
| 4th step (9 impulses): | 1. | 2 | 4 | 6 | 9 | 0 | Type Wheel Position "3" |
| | 2. | 3 | 5 | 7 | 0 | 1 | |
| | 3. | 4 | 6 | 8 | 1 | 2 | |
| | 4. | 5 | 7 | 9 | 2 | 3 | |
| | 5. | 6 | 8 | 0 | 3 | 4 | |
| | 6. | 7 | 9 | 1 | 4 | 5 | |
| | 7. | 8 | 0 | 2 | 5 | 6 | |
| | 8. | 9 | 1 | 3 | 6 | 7 | |
| | 9. | 0 | 2 | 4 | 7 | 8 | Locking Magnet of 5th Order Actuated |
| 5th step (9 impulses): | 1. | 1 | 3 | 5 | 8 | 9 | Type Wheel Position "4" |
| | 2. | 2 | 4 | 6 | 9 | 0 | |
| | 3. | 3 | 5 | 7 | 0 | 1 | |
| | 4. | 4 | 6 | 8 | 1 | 2 | |
| | 5. | 5 | 7 | 9 | 2 | 3 | |
| | 6. | 6 | 8 | 0 | 3 | 4 | |
| | 7. | 7 | 9 | 1 | 4 | 5 | |
| | 8. | 8 | 0 | 2 | 5 | 6 | |
| | 9. | 9 | 1 | 3 | 6 | 7 | No Magnet Actuated |
| 6th step (9 impulses): | 1. | 0 | 2 | 4 | 7 | 8 | Type Wheel Position "5" |
| | 2. | 1 | 3 | 5 | 8 | 9 | |
| | 3. | 2 | 4 | 6 | 9 | 0 | |
| | 4. | 3 | 5 | 7 | 0 | 1 | |
| | 5. | 4 | 6 | 8 | 1 | 2 | |
| | 6. | 5 | 7 | 9 | 2 | 3 | |
| | 7. | 6 | 8 | 0 | 3 | 4 | |
| | 8. | 7 | 9 | 1 | 4 | 5 | |
| | 9. | 8 | 0 | 2 | 5 | 6 | Locking Magnet of 4th Order Actuated |
| 7th step (9 impulses): | 1. | 9 | 1 | 3 | 6 | 7 | Type Wheel Position "6" |
| | 2. | 0 | 2 | 4 | 7 | 8 | |
| | 3. | 1 | 3 | 5 | 8 | 9 | |
| | 4. | 2 | 4 | 6 | 9 | 0 | |
| | 5. | 3 | 5 | 7 | 0 | 1 | |
| | 6. | 4 | 6 | 8 | 1 | 2 | |
| | 7. | 5 | 7 | 9 | 2 | 3 | |
| | 8. | 6 | 8 | 0 | 3 | 4 | |
| | 9. | 7 | 9 | 1 | 4 | 5 | No Magnet Actuated |
| 8th step (9 impulses): | 1. | 8 | 0 | 2 | 5 | 6 | Type Wheel Position "7" |
| | 2. | 9 | 1 | 3 | 6 | 7 | |
| | 3. | 0 | 2 | 4 | 7 | 8 | |
| | 4. | 1 | 3 | 5 | 8 | 9 | |
| | 5. | 2 | 4 | 6 | 9 | 0 | |
| | 6. | 3 | 5 | 7 | 0 | 1 | |
| | 7. | 4 | 6 | 8 | 1 | 2 | |
| | 8. | 5 | 7 | 9 | 2 | 3 | |
| | 9. | 6 | 8 | 0 | 3 | 4 | Locking Magnet of 3rd Order Actuated |
| 9th step (9 impulses): | 1. | 7 | 9 | 1 | 4 | 5 | Type Wheel Position "8" |
| | 2. | 8 | 0 | 2 | 5 | 6 | |
| | 3. | 9 | 1 | 3 | 6 | 7 | |
| | 4. | 0 | 2 | 4 | 7 | 8 | |
| | 5. | 1 | 3 | 5 | 8 | 9 | |
| | 6. | 2 | 4 | 6 | 9 | 0 | |
| | 7. | 3 | 5 | 7 | 0 | 1 | |
| | 8. | 4 | 6 | 8 | 1 | 2 | |
| | 9. | 5 | 7 | 9 | 2 | 3 | No Magnet Actuated |
| 10th step (9 impulses): | 1. | 6 | 8 | 0 | 3 | 4 | Type Wheel Position "9" |
| | 2. | 7 | 9 | 1 | 4 | 5 | |
| | 3. | 8 | 0 | 2 | 5 | 6 | |
| | 4. | 9 | 1 | 3 | 6 | 7 | |
| | 5. | 0 | 2 | 4 | 7 | 8 | |
| | 6. | 1 | 3 | 5 | 8 | 9 | |
| | 7. | 2 | 4 | 6 | 9 | 0 | |
| | 8. | 3 | 5 | 7 | 0 | 1 | |
| | 9. | 4 | 6 | 8 | 1 | 2 | No Magnet Actuated |
| 11th step (9 impulses): | 1. | 5 | 7 | 9 | 2 | 3 | No digit-determining position of Type Wheel |
| | 2. | 6 | 8 | 0 | 3 | 4 | |
| | 3. | 7 | 9 | 1 | 4 | 5 | |
| | 4. | 8 | 0 | 2 | 5 | 6 | |
| | 5. | 9 | 1 | 3 | 6 | 7 | |
| | 6. | 0 | 2 | 4 | 7 | 8 | |
| | 7. | 1 | 3 | 5 | 8 | 9 | |
| | 8. | 2 | 4 | 6 | 9 | 0 | |
| | 9. | 3 | 5 | 7 | 0 | 1 | |
| Restored Original Number | | 3 | 5 | 7 | 0 | 1 | Number printed or indicated |

Finally it should be realized that the whole arrangement and method according to the present invention can be combined with any type of an electronic or electro-mechanical adding or accumulating machine having a key board, a pin carriage, calculating and printing apparatus. The application of the method according to this invention or the use of the means for transferring numerical values from an accumulator in that machine is entirely independent from the other means incorporated in such a machine. Therefore the method and apparatus according to the present invention can very well be applied to, or connected with an existing machine of the above mentioned type.

Figure 10A:
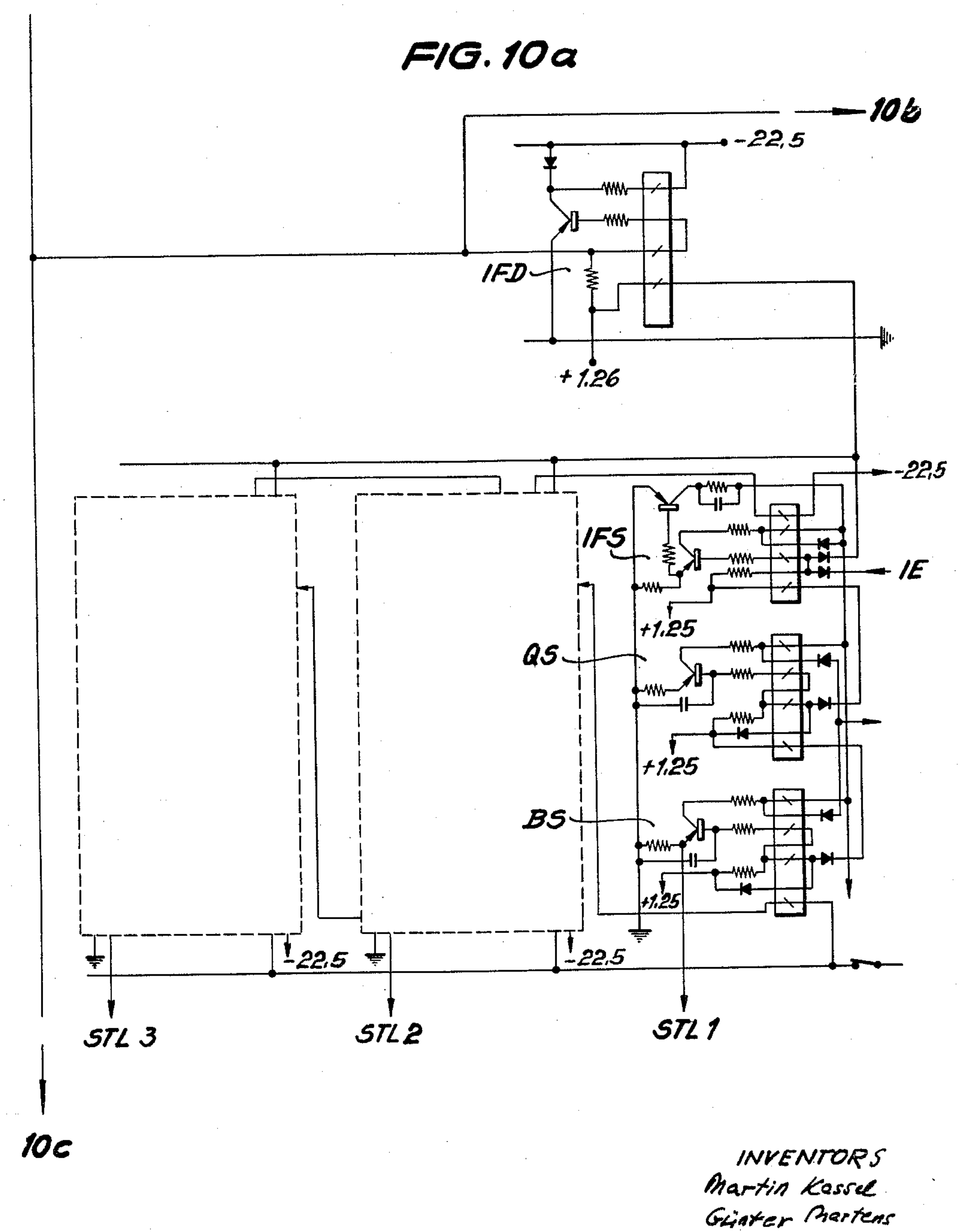
Figure 10B:
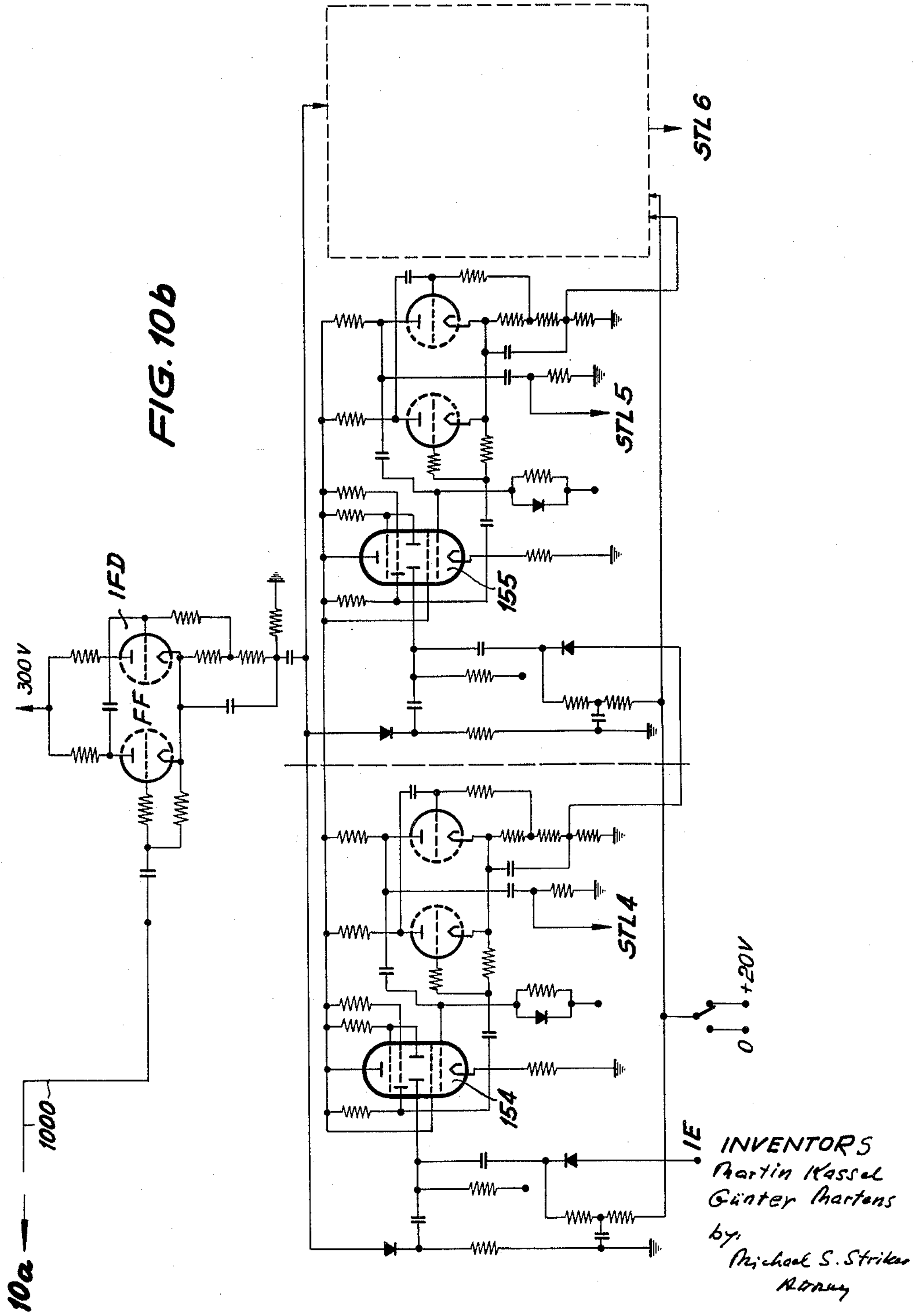
Figure 10C:
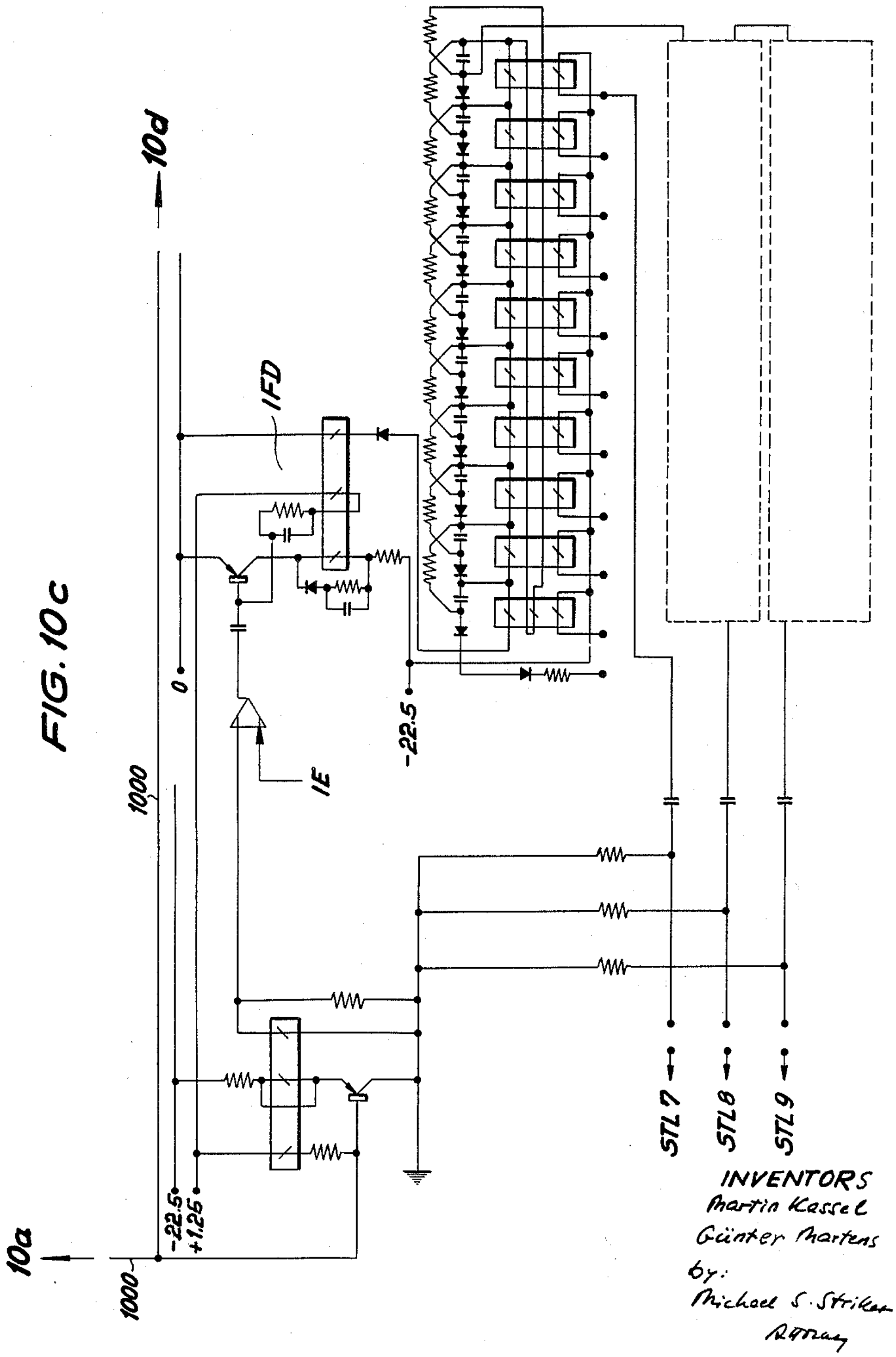
Figure 10D:
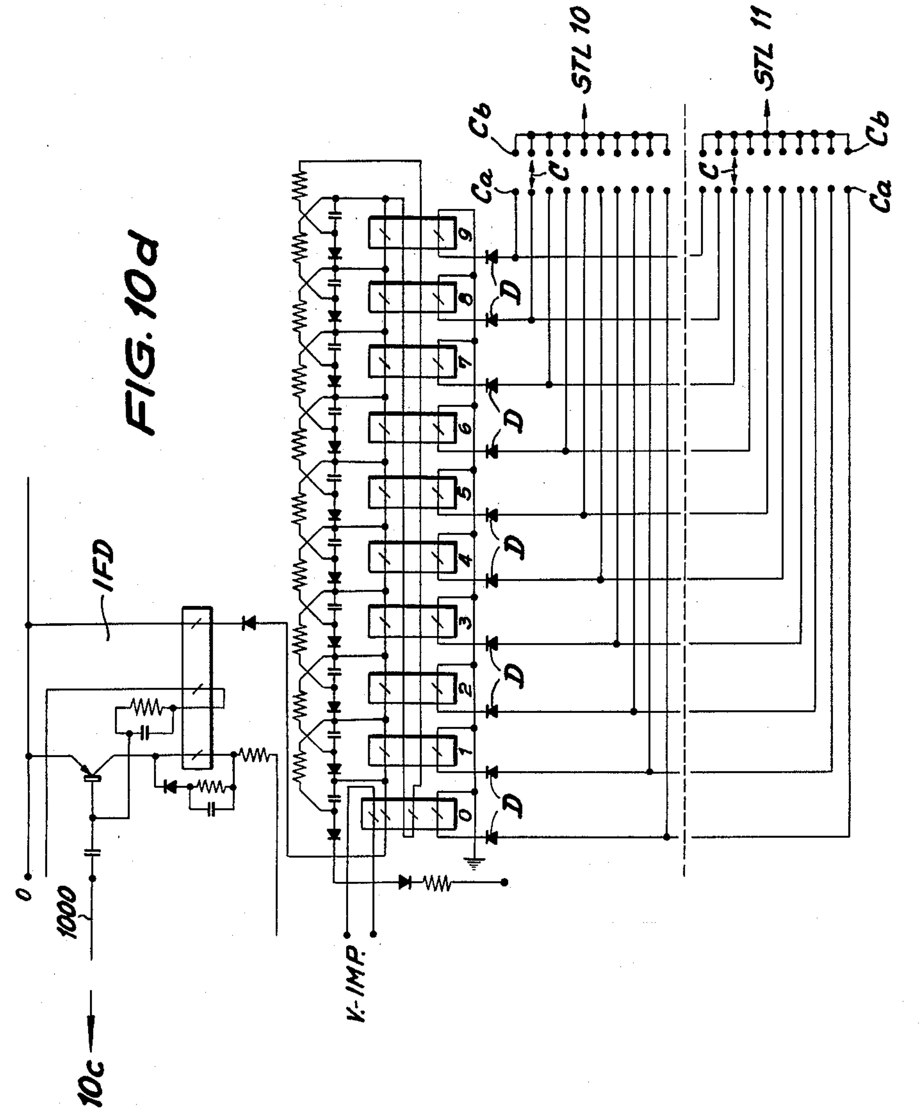

Referring now to FIGS. 10 to 10*d* an embodiment of the invention will be described which includes certain parts of the mechanism described above but also includes the pertaining circuits and electrical components. Wherever in FIGS. 10 to 10*d* elements or components appear which are identical with or equivalent to elements shown in other drawings, the same reference numerals are applied. It will be noted, particularly that in FIG. 10 an electric impulse generator is shown which is illustrated in detail in FIGS. 7 and 8 and described above in reference thereto. In addition to the above described illustrations, FIG. 10 shows also a key board KB for numerical values from 0 to 9 for manually introducing numerical values into the apparatus, and also a pin carriage PC which is arranged beneath the key board in a manner generally known in adding machines.

A power supply unit PS serves to feed energy into the electrical and electronic components of the apparatus. As can be seen the power supply PS furnishes alternating current via lines *a*, *c* to the impulse generator bulb 600, and direct current to the impulse amplifier IF as well as to the locking magnets 144 and to the gates $G_1$–$G_{11}$. It is to be understood that each one of the gates $G_1$–$G_{11}$ is associated with one of the magnets 144, 145 etc. and consequently with the pertaining drive bars 111, 112 etc. Therefore, the printing mechanism illustrated in FIG. 10 has a capacity of 11 digits. Ordinarily the gates $G_1$–$G_{11}$ are in closed condition, but in this condition at all times direct current furnished by the power supply unit PS via line *c* is available for energizing any one of the magnets 144, 145 etc. Whenever a resetting or decimal carry-over impulse is injected from one of the counting stages of an electronic counter or electronic accumulator into one of the gates $G_1$–$G_{11}$, then the particular gate changes to open condition so that the associated magnet 144, 145 etc. is energized and moves its pawl 134, 135 etc. into engagement with the associated driving bar 111, 112 etc, and locks it in its position.

In order to demonstrate in the most convincing manner that a transfer and printing mechanism according to the invention can be successfully and efficiently operated in connection with various types of electronic counters or other similar devices, an embodiment of an assembly incorporating the apparatus according to the invention is described and shown, the particular feature being that the printing mechanism is associated with and controlled by three different types of electronic counters and one electro-mechanical counting mechanism. For this reason the individual FIGS. 10*a* to 10*d* are to be considered portions of a larger drawing which incorporates FIG. 10 also. For the above stated purpose it should be assumed that the decimal order units 1–3 of the printing mechanism are associated with a magnetic counter composed of storage stages illustrated in FIG. 10*a*, the decimal order units 4–6 of the printing mechanism are associated with a counter comprising decimal counting tubes of the type E1T illustrated in FIG. 10*b*, the decimal order units 7–9 of the printing mechanism are associated with a counter comprising a magnetic shift register illustrated in FIG. 10*c*, and the decimal order units 10 and 11 of the printing mechanism are associated with an electro-mechanical step-by-step switch counter as illustrated by FIG. 10*d*.

It is stressed herewith that these four different counting mechanisms are connected simultaneously with the one printing mechanism illustrated in FIG. 10 and operate independently without interfering with each other, but just the same in a manner entirely compatible with the requirements of the printing mechanism.

Since the individual counting devices are not as such subject of the present invention it is not thought necessary to describe their details and their operation. It may suffice to state that the counting impulses are injected into the lowest order unit at the impulses entrance IE. The various order units or decades of such a counter device are therefore connected in series.

Each counting impulse causes the lowest order unit to carry out one digit step in forward direction until the storage or counting capacity of that particular unit is reached or exceeded. At this moment, i.e., in the case of a decimal counter in the moment of the injection of the tenth counting impulse into the lowest order unit, this unit is returned to its original condition corresponding to the value 0, and simultaneously a carry-over pulse is transmitted to the next following order unit corresponding to the so-called "tens-transfer," hereafter the lowest unit continues to count all subsequently injected counting impulses in the same manner as before until the next carry-over or tenth-transfer occurs. The functional operation of such a counter is not affected in any way by the number of order units that may be incorporated in the counter.

For obvious reasons, the counting and storing of injected counting impulses is carried out in different ways in the different illustrated counting devices in accordance with their different structure and type. For instance, in the magnetic storage stage counter according to FIG. 10*a*, a magnet core characterized by having a rectangular hysteresis loop and being substantially magnetically saturated with one polarity to indicate the numerical value "0" is changed to opposite polarities of magnetic saturation alternatingly with each of ten steps. With the tenth step which is caused by the tenth counting impulse, the magnet core of this particular unit is returned in one single step to its original magnetic condition and a carry-over or tenth-transfer impulse is transmitted to the next following unit. A counter of this type is described in more detail in the co-pending patent application Serial No. 616,155 together with all the details of its operation.

In FIG. 10*a* only the first order unit is shown in detail the next following ones are indicated only by rectangles formed by dotted lines. The counting impulses enter the unit at IE and arrive first at an impulse forming stage IFS. In addition this counting stage comprises two storage stages, namely a quinary stage QS having a capacity for storing 5 impulses, and a series connected binary stage BS the core of which has a capacity for two impulses. From the binary stage BS the carry-over impulse, upon the injection of the tenth impulse, is transmitted either to the next following stage, during the read-out operation by the printing mechanism, via the control line STL–1 to the gate $G_1$ whereby this gate is caused to open and the magnet 144 of the lowest order unit of the printing mechanism is energized.

In the case of the counter comprising tubes as shown in FIG. 10*b* a cathode ray can be moved consecutively between ten different characteristic positions, in each of which the ray indicates on a screen its actual position, which means that it indicates how many impulses have been introduced into the counting tube up to a particular moment. The cathode ray is moved from its zero position by each arriving counting impulse one step further, each step corresponding to one digit unit, so that after the ninth impulse the ray assumes the position corresponding to the valve "9." Each tenth impulse moves the ray beyond the position "9." A flip-flop FF associated with each one of the E1T tubes, skips then from its normal position into a second position in which it causes the cathode ray in one step to return to its zero position while simultaneously a transfer impulse is transmitted to the counting tube of the next following unit. In FIG. 10*b* the first and second counting stages, comprising the tubes 154, 155, respectively (see FIG. 1) are shown in detail, the next following stage is indicated diagrammatically by rectangle formed by dotted lines. The operation and further details of the E1T tubes are entirely known to the art and are described for instance in publications of the manufacturer, the Philips Co.

In the case of a counter comprising a shift register as illustrated by FIG. 10*c*, 10 magnet cores are provided for each decimal counting unit. One such register is shown in detail, two other units of the counter are indicated only diagrammatically by rectangles formed by dotted lines. At the start of operation the core corresponding to the value "0" is in a substantially saturated magnetic condition with one polarity, while all the other 9 cores are in the same condition but of opposite polarity. Each injected counting impulse causes the core which is in the first mentioned condition to change to the condition of opposite polarity while at the same time the polarity of magnetic saturation of the next following core is reversed. The tenth impulse reverses the magnetization of the last core associated with the value "9" and returns it in this manner to its original condition. Simultaneously the first core associated with the value "0" is changed to its opposite polarity of magnetic saturation whereby the condition indicating "0" is again reestablished. Simultaneously with the change of magnetization of the core "9" the carry-over or transfer impulse is transmitted to the next following shift register. Shift registers of this type are described together with their operation in all detail in the co-pending patent application Serial No. 666,096, now abandoned.

A description of the counting device according to FIG. 10*d* follows further below.

While the preceding paragraphs deal briefly with the impulse counting procedure in the above mentioned counters which, as stated above, are as such not subject of the present invention, now the operation of the transfer of values to the printing mechanism will be described in reference to FIGS. 10, 10*a*, 10*b* and 10*c*. By operation of one of the keys or buttons KB of the key board for the purpose of causing a printed reproduction of a particular numerical value, the drive motor of the printing mechanism, for instance 132 in FIG. 1, is started. Simultaneously the line or connection which carries otherwise the counting impulses to the electronic counter, is interrupted, i.e., switch devices are actuated which prevent counting impulses from arising at the impulse entrance IE of any one of the counters. In addition, carry-over or tens-transfers between the individual order units of the counter are blocked and the impulses appearing in the transfer lines are switched via the control lines STL1–11 to the associated gates $G_1$–$G_{11}$, respectively, and from there to the printing mechanism. There each arriving impulse, as described above, causes energization of the corresponding locking magnets. The above mentioned blocking and switching in the transfer lines can be effected electronically by blocking diodes, or electrically by actuating a switching relay, or simply by changing the position of an electric switch.

The operation of the drive motor of the printing mechanism causes the individual driving bar 111, 112 etc. to move forward. At the same time the impulse generator members 689, 691 of the impulse generating device 600, 600'' are moved via bars 131, **131*a* so that a series of ten impulses is transmitted across the impulse amplifier IF and into the main feed line 1000**. This series of ten impulses effects a complete cycle of the electronic counters so that after the transmission or injection of the above mentioned ten impulses these counters arrive at their original position or condition. As is shown in FIGS. 10*a*—10*b* an impulse forming device JFD is provided between the main feed line 1000 and the individual counters.

It can be seen that during the impulse counting operation the individual order units of the counters are connected in series while during the reading out for the purpose of printing the particular numerical values they are connected in parallel. In other words, while the counting of the counting impulses is carried out serially, the reading-out for the purpose of printing is carried out in parallel manner.

Referring now to FIG. 10*d* assigned to the order units 10 and 11 a counting mechanism is provided which comprises for every order unit a step-by-step switch. Such step-by-step switches are well known as so called rotary switches and used extensively in communication equipment as for instance in automatic dial-type telephone exchanges and are used there for selecting the line connection in accordance with the numbers dialed by the party who makes the call. Step-by-step switches of this type are provided with a series of corresponding contacts as indicated at *Ca* and *Cb*. The switching or wiper arm C connects in any one of its possible positions two opposing contacts of these two contact rows. FIG. 10*d* illustrates one such switch in greater detail, and includes the series of contacts associated with the decimal order 10, while for the decimal order unit 11 only the series of contacts and a portion of the associated control lines are shown. As can be seen, in the order unit 10 the wiper arm C is positioned so as to correspond to the numerical value "8," while in the order unit 11 the arm C is positioned so as to correspond to the value "7." When the counting impulses are injected, the wiper arm C of the lowest order unit of the switch is moved with each impulse by means of an electro magnet into its next following position. The wiper arm is carried by a rotatable shaft which also carries an indicator disk which by means of numerals applied along its circumference indicates in any position of the wiper arm which numerical value this position is associated with. In order to be able to readout this purely electro mechanical counter device by means of the printing mechanism illustrated in FIG. 10 simultaneously with the electronic counters in order to be able to print the numerical values corresponding to the positions assumed by said switch mechanism, an electronic counting or shift register of the type described in reference to FIG. 10*c*, is provided as an intermediate element between the printing mechanism and the actual step-by-step switch. When this shift register is read out it emits through lines branched off in transverse direction from the individual magnet cores, with every step one impulse which is transmitted via the particular pairs of contacts connected by one wiper arm C to the gate of the associated order unit so that an impulse is injected into the associated locking magnet 144 etc. for the purpose mentioned above.

While it is necessary in electronic counters to put a series of ten consecutive impulses through a counter in order to produce a complete cycle thereof, this is not necessary in the case of electro-mechanical step-by-step switch devices. It can be seen readily that this type of switch remains in a particular position corresponding to a particular numerical value, during the read-out operation. The positions of the wiper arm C do not change during this phase of the operation. Therefore it is also necessary to temporarily disconnect the tens-transfer lines between the individual decimal order unit during the operation of this type of switch. However, for preventing return pulses or similar undesirable effects from the step-by-step switch toward the magnetic shift register during the counting operation, diodes D are provided in each of the read-out lines between the shift register and the associated contacts of the step-by-step switch.

It will be understood that each of the elements described above, or two or more together, may also find a useful application in other types of method and apparatus for transferring numerical values to other apparatus differing from the types described above.

While the invention has been illustrated and described as embodied in method and apparatus for transferring numerical values from an electronic accumulator to a mechanical counting, indicating or printing apparatus, it is not intended to be limited to the details shown, since various modifications and structural changes may be made without departing an any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an arrangement for transferring a numerical value accumulated in an electronic accumulator including at least one counting stage capable of storing such numerical value, to a mechanical counting, indicating or printing apparatus having at least one set of incrementally movable digit-determining primary control elements and digit-exhibiting secondary elements operatively connected with each other and capable of assuming two states of motion, one of which is standstill, the other one being movement, said elements being capable of sequentially assuming consecutive positions respectively associated with a series of digits forming part of a numerical value to be indicated or printed, in combination, drive means for advancing said primary control elements incrementally through said consecutive position; an impulse generator means operatively connected with said drive means and capable of generating impulse sequences of predetermined numbers of electric impulses synchronously with the passing of said primary control elements through a corresponding number of said consecutive positions, respectively; first circuit means connecting said impulse generator means with said counting stage for injecting said predetermined number of said electric impulses as counting impulses into the latter so as to shift revolvingly a numerical value stored in said counting stage through the latter; electromagnetic means for causing said secondary elements to undergo a change from one of said states of motion to the other one, said electromagnetic means being responsive to a control impulse applied thereto and being capable of effecting said change in any one of said positions of said primary control elements upon application of such a control impulse; and second circuit means connecting said counting stage with said electromagnetic means and capable of transmitting thereto said control impulse every time when coincidently with injecting the last one of said predetermined number of electric impulses in one of said sequences into said counting stage the counting capacity thereof is exhausted.

2. In an arrangement for transferring a numerical value accumulated in an electronic accumulator including at least one counting stage capable of storing such numerical value, to a mechanical counting, indicating or printing apparatus having at least one set of incrementally movable digit-determining control elements and digit-exhibiting elements operatively connected with each other and capable of sequentially assuming consecutive positions respectively associated with a series of digits existing in a numerical value to be indicated or printed, in combination, drive means for advancing said set of elements incrementally through said consecutive positions; an impulse generator means operatively connected with said drive means and capable of generating impulse sequences of predetermined numbers of electric impulses synchronously with the passing of said set of elements through a corresponding number of said consecutive positions, respectively; first circuit means connecting said impulse generator means with said counting stage for injecting said predetermined number of said electric impulses as counting impulses into the latter so as to shift revolvingly a numerical value stored in said counting stage through the latter; electromagnetic arresting means operatively connected with said set of control elements, said arresting means being responsive to a control impulse applied thereto and capable of arresting said set of control elements in any one of said positions thereof upon application of such a control impulse; and second circuit means connecting said counting stage with said arresting means and capable of transmitting thereto said control impulse every time when coincidently with injecting the last one of said predetermined number of electric impulses in one of said sequences into said counting stage the counting capacity thereof is exhausted.

3. In an arrangement for transferring a multi-order numerical value accumulated in an electronic accumulator including a plurality of counting stages capable of storing such numerical value and respectively assigned to different numerical orders, to a mechanical counting, indicating or printing apparatus having a corresponding plurality of sets, respectively associated with said counting stages, of incrementally movable digit-determining control elements and digit-exhibiting elements operatively connected with each other and capable of sequentially assuming consecutive positions respectively associated with a series of digits existing in the respective associated order of a multi-order numerical value to be indicated or printed, in combination, drive means for advancing simultaneously said plurality of sets of elements incrementally through said consecutive positions; an impulse generator means operatively connected with said drive means and capable of generating impulse sequences of predetermined numbers of electric impulses synchronously with the passing of said sets of elements through a corresponding number of said consecutive positions, respectively; first circuit means connecting said impulse generator means with said plurality of counting stages for injecting said predetermined number of said electric impulses as counting impulses into the latter so as to shift revolvingly a numerical value stored in said counting stage through the latter; a plurality of electromagnetic arresting means respectively associated and operatively connected with said sets of control elements, said arresting means being responsive to a control impulse applied thereto and capable of arresting the associated set of control elements in any one of said positions thereof upon application of such a control impulse; and second circuit means connecting said counting stages respectively with the associated ones of said arresting means and capable of transmitting thereto said control impulse every time when coincidently with injecting the last one of said predetermined number of electric impulses in one of said sequences into said counting stages the counting capacity of the stage associated with the particular arresting means is exhausted.

4. An arrangement as set forth in claim 3, including means for causing said digit-exhibiting elements to be arrested by the action of said arresting means on said control elements in positions respectively exhibiting numerical values which are identical with the numerical values stored in said electronic accumulator before the start of the transferring operation.

5. An arrangement as set forth in claim 3, wherein said digit-exhibiting elements are arranged to be arrested by the action of said arresting means on said control elements in positions respectively exhibiting numerical values which are the complement values of the numerical value stored in said electronic accumulator before the start of the transferring operation, and wherein transforming means are provided for re-transforming said complement values into said numerical values.

6. An arrangement as set forth in claim 1, wherein said electromagnetic means include means for establishing driving connection between said digit-determining control elements and said digit-exhibiting elements upon the application of said control impulse whereby said secondary elements are thereafter caused to move conjointly with said primary control elements through said consecutive positions.

7. An arrangement as set forth in claim 3, wherein said impulse generator means includes a source of energy, circuit means connected to said source and including a normally open switch means; and an actuating member operatively connected with said drive means for movement in unison therewith along said switch means and carrying a plurality of interspaced switch-closing members capable of engaging said switch means in predetermined time intervals during movement of said actuating member past said switch means.

8. An arrangement as set forth in claim 7, wherein said switch-closing members are non-equidistantly spaced from each other the spacing being adjusted for each interval between consecutive members to correspond to the speed of said actuating member to the extent as said speed varies between different portions of the movement of said actuating member along its path.

9. An arrangement as set forth in claim 3, wherein said impulse generator means includes an electromagnet comprising a permanent magnet core member and an induction coil surrounding a portion of said core, said core being formed to have two spaced ends in position opposite each other, one of said ends shaped as a pole piece, the other end formed as a guide means, and an elongated actuating member of ferromagnetic material connected with at least one of said sets of elements for movement in unison therewith along said guide means, said actuating member being formed with a plurality of inter-spaced pole tips separated by notches and therefore capable of alternatingly increasing and decreasing the magnetic flux in said core as said spaced pole tips are moved past said pole piece so that during said movement of said actuating member voltage impulses are induced in said coil in predetermined intervals.

10. An arrangement as set forth in claim 9, wherein said pole tips are non-equidistantly spaced from each other, the spacing being adjusted for each interval between consecutive pole tips to correspond to the speed of said actuating member to the extent as said speed varies between different portions of the movement of said actuating member along its path.

11. An arrangement as set forth in claim 3, wherein said impulse generator means includes a permanent magnet core formed to have two spaced ends opposite each other, one of said ends being formed as a pole piece, the other end being formed as a guide means, said pole piece being equipped with a pole plate made of a metal whose electric resistance varies with a change of the intensity of a surrounding magnetic field, a source of electric energy, circuit means connected to said source and including a load in series with said pole plate, an elongated actuating member of ferromagnetic material connected with at least one of said sets of control elements for movement in unison therewith along said guide means, said actuating member being formed with a plurality of inter-spaced pole tips separated by notches and therefore capable of alternatingly increasing and decreasing the magnetic flux in said core as said spaced pole tips are moved past said pole plate so that during said movement of said actuating member voltage impulses are created across said load in predetermined intervals.

12. An arrangement as set forth in claim 11, wherein said pole tips are non-equidistantly spaced from each other, the spacing being adjusted for each interval between consecutive pole tips to correspond to the speed of said actuating member to the extent as said speed varies between different portions of the movement of said actuating member along its path.

13. An arrangement as set forth in claim 3, wherein said impulse generator means includes a photo-electric cell, a source of light positioned to direct a beam of light at said photo-cell, an actuating member operatively connected with said drive means for movement in unison therewith and across said beam of light, said actuating member being provided with a plurality of interspaced light gaps adapted to create an impulse in said photocell every time when one of said light gaps passes across said beam of light.

14. An arrangement as set forth in claim 13, wherein said light gaps are non-equidistantly spaced from each other, the spacing being adjusted for each interval between consecutive light gaps to correspond to the speed of said actuating member to the extent as said speed varies between different portions of the movement of said actuating member along its path.

15. An arrangement as set forth in claim 13, wherein said actuating member is an elongated flat element moving along a straight path.

16. An arrangement as set forth in claim 13, wherein said actuating member is a rotatable disc, a drive member being provided for operatively connecting said disc with said drive means and for converting the movement of the latter into rotary movement of said disc.

17. In an arrangement for transferring multi-order numerical values from an electronic calculating or counting device into a mechanical counting, indicating or printing apparatus, in combination, an electronic accumulator comprising a plurality of first counting stages respectively assigned to the individual orders of said numerical values; means for injecting counting impulses into said accumulator for storing a plurality of number values respectively in said stages; a plurality of control elements capable of moving stepwise between consecutive digit-determining positions and forming part of said mechanical apparatus, each of said control elements being associated with one of said counting stages, respectively, for setting the corresponding order units of said apparatus in positions corresponding to the digits that are transferred from said counting stages to said units; a plurality of locking magnet means associated and electrically connected with each of said counting stages, respectively, and capable of being energized by an impulse emitted from an associated counting stage, and operatively connected with said control elements, respectively, for arresting such control elements in any one of its digit-determining positions upon energization of the particular magnet means; a plurality of gate means respectively interposed between each of said counting stages and the associated magnet means for blocking or opening a path for an impulse from a counting stage to its associated locking magnet means, depending upon the blocking or non-blocking state, respectively, of the interposed gate means; first switch means, in its open position being capable of disconnecting said accumulator from said means for injecting counting impulses, and of separating said counting stages of said accumulator from each other for preventing a carry-over impulse from being transferred to the next counting stage; an electronic shift register comprising a plurality of second counting stages and capable of receiving individual shifting impulses, and connected with said electronic accumulator so as to be capable of injecting, upon having received a shifting impulse, a series of consecutive impulses simultaneously into all of the individual counting stages of said electronic accumulator; first impulse generator means adapted to be connected to said electronic shift register for furnishing said shifting impulses; second impulse generator means operatively connected with said stepwise moving control elements and capable of producing with every step of said control elements an impulse alternatively adapted to operate said accumulator or said electronic shift register; second switch means connected with the output of said second impulse generator means and movable between a first position in which said second impulse generator means is connected with said electronic shift register for injecting into the latter a first shifting impulse, and a second position in which said second impulse generator means is connected with said gate means for changing the state of the latter between blocking and non-blocking condition; and selector switch means interposed between said second impulse generator means and said second switch means and movable between a first position in which the output of said second impulse generator means is connected with said second switch means, and a second position in which the output of said second impulse generator means is connected with all of the counting stages of said electronic accumulator for injecting individual impulses furnished by said second impulse generator means simultaneously into all the counting stages of said electronic accumulator when said first switch means is in its open position.

18. In an arrangement for transferring multi-order decimal numerical values from an electronic calculating or counting device operating in one direction only into a mechanical counting, indicating or printing apparatus, in combination, an electronic accumulator comprising a plurality of first counting stages respectively assigned to the individual decimal orders of said numerical values; means for injecting counting impulses into said accumulator for storing a plurality of number values respectively in said stages; a plurality of control elements capable of moving stepwise between ten consecutive digit-determining positions and forming part of said mechanical apparatus, each of said control elements being associated with one of said counting stages, respectively, for setting the corresponding decimal order units of said apparatus in positions corresponding to the digits that are transferred from said counting stages to said units; a plurality of locking magnet means associated and electrically connected with each of said counting stages, respectively, and capable of being energized by an impulse emitted from an associated counting stage, and operatively connected with said counting stages, respectively, for arresting such control elements in any one of its ten digit-determining positions upon energization of the particular magnet means; a plurality of gate means respectively interposed between each of said counting stages and the associated magnet means for blocking or opening a path for an impulse from a counting stage to its associated locking magnet means, depending upon the blocking or non-blocking state, respectively, of the interposed gate means; first switch means, in its open position being capable of disconnecting said accumulator from said means for injecting counting impulses, and of separating said first counting stages of said accumulator from each other for preventing a carry-over impulse from being transferred to the next counting stage; an electronic shift register comprising at least ten second counting stages and capable of recieving individual shifting impulses, and connected with said electronic accumulator so as to be capable of injecting, upon having received a shifting impulse, a series of consecutive impulses simultaneously into all of the individual counting stages of said electronic accumulator; first impulse generator means adapted to be connected to said electronic shift register for furnishing said shifting impulses; second impulse generator means operatively connected with said stepwise moving control elements and capable of producing with every step of said control elements an impulse alternatively adapted to operate said accumulator or said electronic shift register; second switch means connected with the output of said second impulse generator means and movable between a first position in which said second impulse generator means is connected with said electronic shift register for injecting into the latter a first shifting impulse, and a second position in which said second impulse generator means is connected with said gate means for changing the state of the latter between blocking and non-blocking conditions; and selector switch means interposed between said second impulse generator means and said second switch means and movable between a first position in which the output of said second impulse generator means is connected with said second switch means, and a second position in which the output of said second impulse generator means is connected with all of said first counting stages of said electronic accumulator for injecting individual impulses furnished by said second impulse generator means simultaneously into all of said first stages of said electronic accumulator when said first switch means is in its open position.

19. In an arrangement for transferring multi-order numerical decimal values from an electronic calculating or counting device operating in one direction only into a mechanical counting, indicating or printing apparatus, in combination, an electronic accumulator comprising a plurality of first counting stages respectively assigned to the individual decimal orders of said numerical values; means for injecting counting impulses into said accumulator for storing a plurality of number values respectively in said counting stages; a plurality of control elements capable of moving stepwise between ten consecutive digit-determining positions and forming part of said mechanical apparatus, each of said control elements being associated with one of said counting stages, respectively, for setting the corresponding decimal order units of said apparatus in positions corresponding to the digits that are transferred from said counting stages to said units; a plurality of locking magnet means associated and electrically connected with each of said counting stages, respectively, and capable of being energized by an impulse emitted from an associated counting stage, and operatively connected with said control elements, respectively for arresting such control elements in any one of its ten digit-determining positions upon energization of the particular magnet means; a plurality of gate means respectively interposed between each of said counting stages and the associated magnet means for blocking or opening a path for an impulse from a counting stage to its associated locking magnet means, depending upon the blocking or non-blocking state, respectively, of the interposed gate means; first switch means, in its open position being capable of disconnecting said accumulator from said means for injecting counting impulses, and of separating said counting stages of said accumulator from each other for preventing an carry-over impulse from being transferred to the next counting stage; an electronic shift register comprising at least ten second counting stages and capable of receiving individual shifting impulses, and connected with said electronic accumulator so as to be capable of injecting, upon having received a shifting impulse, a series of consecutive impulses simultaneously into all of the individual counting stages of said electronic accumulator; first impulse generator means adapted to be connected to said electronic shift register for furnishing said shifting impulses; second impulse generator means operatively connected with said stepwise moving control elements and capable of producing with every one of the ten consecutive steps of said control elements an impulse, the first one of said impulses being associated with the "0" position and every following impulse being associated with one of the progressively increasing number positions, respectively, of said control elements, said impulses being alternatively adapted to operate said accumulator or said electronic shift register; second switch means connected with the output of said second impulse generator means and movable between a first position in which said second impulse generator means is connected with said electronic shift register for injecting into the latter a first shifting impulse, and a second position in which said second impulse generator means is connected with said gate means for changing the state of the latter between blocking and non-blocking condition; and selector switch means interposed between said second impulse generator means and said second switch means and movable between a first position in which the output of said second impulse generator means is connected with said second switch means, and a second position in which the output of said second impulse generator means is connected with all of the counting stages of said electronic accumulator for injecting individual impulses furnished by said second impulse generator means simultaneously into all the counting stages of said electronic accumulator when said first switch means is in its open position.

20. In an arrangement for transferring multi-order decimal numerical values from an electronic calculating or counting device operating in one direction only into a mechanical counting, indicating or printing apparatus, in combination, an electronic accumulator comprising a plurality of first counting stages respectively assigned to the individual decimal orders of said numerical values; means for injecting counting impulses into said accumulator for storing a plurality of number values respectively in said counting stages; a plurality of control elements capable of moving stepwise between ten consecutive digit-determining positions and forming part of said mechanical apparatus, each of said control elements being associated with one of said counting stages, respectively, for setting the corresponding decimal order units of said apparatus in positions corresponding to the digits that are transferred from said counting stages to said units; a plurality of locking magnet means associated and electrically connected with each of said counting stages, respectively, and capable of being energized by an impulse emitted from an associated counting stage, and operatively connected with each of said counting stages, respectively, resting such control elements in any one of its ten digit-determining positions upon energization of the particular magnet means; a plurality of gate means respectively interposed between each of said counting stages and the associated magnet means for blocking or opening a path for an impulse from a counting stage to its associated locking magnet means, depending upon the blocking or non-blocking state, respectively, of the interposed gate means; first switch means, in its open position being capable of disconnecting said accumulator from said means for injecting counting impulses, and of separating said counting stages of said accumulator from each other for preventing a carry-over impulse from being transferred to the next counting stage; an electronic shift register comprising eleven second counting stages and capable of receiving individual shifting impulses, and connected with said electronic accumulator so as to be capable of injecting, upon having received a first shifting impulse, a first series of ten consecutive impulses, and upon receiving any one of the following ten impulse one series of nine consecutive impulses, the consecutive impulses of each of said series to be injected simultaneously into all of the individual counting stages of said accumulator; first impulse generator means adapted to be connected to said electronic shift register for furnishing said shifting impulses; second impulse generator means operatively connected with said stepwise moving control elements and capable of producing with every one of the ten consecutive steps of said control elements an impulse, the first one of said impulses being associated with the "0" position and every following impulse being associated with one of the progressively increasing number positions, respectively, of said control elements, said impulses being alternatively adapted to operate said accumulator or said electronic shift register; means operatively connected with said second counting stages and capable of injecting, after the completion of said ten consecutive steps therof, an eleventh impulse into said electronic shift register; second switch means connected with the output of said second impulse generator means and movable between a first position in which said second impulse generator means is connected with said electronic shift register for injecting into the latter a first shifting impulse, and a second position in which said second impulse generator means is connected with said gate means for changing the state of the latter between blocking and non-blocking condition; and selector switch means interposed between said second impulse generator means and said second switch means and movable between a first position in which the output of said second impulse generator means is connected with said second switch means, and a second position in which the output of said second impulse generator means is connected with all of the counting stages of said electronic accumulator for injecting individual impulses furnished by said second impulse generator means simultaneously into all the counting stages of said electronic accumulator when said first switch means is in its open position.

21. An arrangement as set forth in claim 20, wherein said second switch means is capable of being moved between its two operative positions by injected impulses, and having a second input connection with the last counting stage of said shift register, its said first position depending upon an impulse furnished by said second impulse generator means so that hereby a first shifting impulse is injected into said shift register, while the second position of said second switch means depends upon the last impulse of each series of consecutive impulses furnished by said shift register so that hereby an impulse is injected into said gate means to change the latter to non-blocking condition.

22. An arrangement as set forth in claim 21, wherein said electronic shift register includes means for causing a preparatory magnetization change of the first one of said second counting stages of said shift register before the cycle of transferring numerical values is started, so that the first impulse from said second impulse generator means causes said first impulse generator means to inject a shifting impulse into said first one of said second counting stages for step-by-step transmission along said shift register and for final delivery as said last impulse from the last one of said second counting stages thereof.

23. An arrangement as set forth in claim 22, wherein said electronic shift register includes means for transmitting said last impulse delivered from said last one of said second counting stages of said shift register, to the second one of said second counting stages thereof for changing the magnetization thereof so as to prepare said shift register for the next shifting impulse introduced into said first one of said second counting stages whereby the next following series of consecutive impulses delivered by said shift register is reduced to nine impulses.

24. An arrangement as set forth in claim 23, wherein a delay circuit is interposed between said electronic shift register and said electronic accumulator for predeterminedly delaying the actuation of said locking magnets by any one of said counting stages of said accumulator after any one of said consecutive impulses of any one of said series of impulses has been emitted from any one of said second counting stages of said shift register.

25. In an arrangement for transferring multi-order numerical values from an electronic calculating or counting device into a mechanical counting, indicating or printing apparatus having a plurality of order units, in combination, a plurality of control elements movable stepwise between consecutive digit-determining positions and forming part of said mechanical apparatus, each of said control elements being associated with a different order unit of said apparatus and being capable of being arrested in any one of its digit-determining positions; drive means for moving said control element stepwise through said positions; an electronic accumulator means including a plurality of sets of first counting stages, gate means and locking magnet means respectively associated with each other and being capable of being alternatively set for one of two modes of operation, and of being actuated, in a first mode of operation, for accumulating multi-order numerical values in accordance with first counting impulses injected into said accumulator means, and, in a second mode of operation, of selectively arresting selected ones of said control elements in one of said positions by carry-over impulses emitted from respective counting stages into the respectively associated gate means and locking magnet means when upon injection of a series of a predetermined number of consecutive second counting impulses simultaneously into all of said counting stages the counting capacity of a particular counting stage is exhausted at the time of the last counting impulse of said series thereof is injected; an electronic shift register means including a plurality of second counting stages and first impulse generator means, and being capable of producing said series of a predetermined number of consecutive impulses upon receiving a first control impulse from said first impulse generator means; second impulse generator means operatively connected with said drive means for furnishing with each step thereof a second control impulse to said first impulse generator means for causing the latter to issue said first control impulse; means for blocking all of said gate means during the production of said series of a predetermined number of consecutive impulses except that of the last one thereof, and for unblocking all of said gate means during said last one of said consecutive impulses of said series thereof; and a plurality of switch means respectively connected with said accumulator and said electronic shift register means for changing said electronic accumulator means between said alternative modes of operation.

References Cited in the file of this patent

UNITED STATES PATENTS

| | | |
|---|---|---|
| 2,783,939 | Boyden et al. | Mar. 5, 1957 |
| 2,793,807 | Yaeger | May 28, 1957 |
| 2,914,759 | Deighton et al. | Nov. 24, 1959 |
| 2,966,671 | Abbott | Dec. 27, 1960 |